United States Patent
Derckx et al.

(10) Patent No.: US 12,032,669 B2
(45) Date of Patent: Jul. 9, 2024

(54) BIOMETRIC SKIN CONTACT SENSING APPARATUS AND METHOD

(71) Applicant: TOUCH BIOMETRIX LIMITED, Wales (GB)

(72) Inventors: Henricus Derckx, St Asaph (GB); Wilhelmus Van Lier, St Asaph (GB); Michael A. Cowin, St Asaph (GB)

(73) Assignee: TOUCH BIOMETRIX LIMITED, St. Asaph (GB)

( * ) Notice: Subject to any disclaimer, the term of this patent is extended or adjusted under 35 U.S.C. 154(b) by 37 days.

(21) Appl. No.: 17/616,483

(22) PCT Filed: Jun. 5, 2020

(86) PCT No.: PCT/GB2020/051373
§ 371 (c)(1),
(2) Date: Dec. 3, 2021

(87) PCT Pub. No.: WO2020/245606
PCT Pub. Date: Dec. 10, 2020

(65) Prior Publication Data
US 2022/0301336 A1     Sep. 22, 2022

(30) Foreign Application Priority Data

Jun. 5, 2019  (GB) ..................................... 1907998
Jun. 5, 2019  (GB) ..................................... 1908040
(Continued)

(51) Int. Cl.
*G06F 21/32*  (2013.01)
*G06F 3/0354*  (2013.01)
(Continued)

(52) U.S. Cl.
CPC .......... *G06F 21/32* (2013.01); *G06F 3/03543* (2013.01); *G06F 3/03547* (2013.01);
(Continued)

(58) Field of Classification Search
CPC .. G06F 21/32; G06F 3/03543; G06F 3/03547; G06F 3/041661; G06F 3/044;
(Continued)

(56) References Cited

U.S. PATENT DOCUMENTS 9,465,491 B2  10/2016  Shaikh et al.
2002/0122026 A1  9/2002  Bergstrom
(Continued)

FOREIGN PATENT DOCUMENTS

CN     205091713 U    3/2016
CN     105528592      4/2016
(Continued)

OTHER PUBLICATIONS

Search & Exam Report issued in Appl. No. GB1908040.7 (Jul. 30, 2019).
(Continued)

*Primary Examiner* — Jonathan A Boyd
(74) *Attorney, Agent, or Firm* — Barnes & Thornburg LLP

(57) ABSTRACT

Disclosed herein is a biometric skin-contact sensor comprising: a contact sensing area comprising an array of pixels, each pixel comprising a thin film transistor and a capacitive sensing electrode for sensing contact; and a controller coupled to the contact sensing area and configured to operate the array of pixels to switch between a low resolution mode and a high resolution mode. In the low resolution mode the sensor is operable to obtain contact location data comprising an indication of a sub-region of the contact sensing area in which contact is sensed. In the high resolution mode the
(Continued)

sensor is operable to obtain biometric data for skin interacting with the contact sensing area by identifying a difference in capacitance between valleys and ridges of the skin.

20 Claims, 11 Drawing Sheets

(30) Foreign Application Priority Data

Jun. 26, 2019 (GB) .................................... 1909209
Sep. 26, 2019 (GB) .................................... 1913912

(51) Int. Cl.
| | |
|---|---|
| *G06F 3/041* | (2006.01) |
| *G06F 3/044* | (2006.01) |
| *G06F 21/44* | (2013.01) |
| *G06V 40/12* | (2022.01) |
| *H01L 27/12* | (2006.01) |
| *G06V 40/13* | (2022.01) |

(52) U.S. Cl.
CPC ........ *G06F 3/041661* (2019.05); *G06F 3/044* (2013.01); *G06F 3/0446* (2019.05); *G06F 21/44* (2013.01); *G06V 40/1359* (2022.01); *H01L 27/1255* (2013.01); *H01L 27/127* (2013.01); *G06F 2203/0336* (2013.01); *G06V 40/1306* (2022.01); *H01L 27/1218* (2013.01)

(58) Field of Classification Search
CPC ............... G06F 3/0446; G06F 21/44; G06F 2203/0336; G06F 2203/0338; G06F 3/033; G06V 40/1359; G06V 40/1306; G06V 40/11; H01L 27/1255; H01L 27/127; H01L 27/1218

See application file for complete search history.

(56) References Cited

U.S. PATENT DOCUMENTS

| | | | |
|---|---|---|---|
| 2008/0030302 | A1 | 2/2008 | Franza et al. |
| 2012/0026117 | A1 | 2/2012 | Schneider et al. |
| 2013/0287274 | A1 | 10/2013 | Shi et al. |
| 2014/0077827 | A1 | 3/2014 | Seguine |
| 2014/0266262 | A1 | 9/2014 | Taghibakhsh |
| 2014/0333328 | A1* | 11/2014 | Nelson .................... G06F 3/044 |
| | | | 324/663 |
| 2015/0049046 | A1 | 2/2015 | Tan |
| 2015/0070137 | A1 | 3/2015 | Minteer et al. |
| 2016/0034739 | A1 | 2/2016 | Chin |
| 2016/0098140 | A1 | 4/2016 | Lee et al. |
| 2016/0328593 | A1 | 11/2016 | Ho |
| 2016/0364591 | A1* | 12/2016 | El-Khoury .......... G06F 3/04817 |
| 2017/0140194 | A1 | 5/2017 | Qin et al. |
| 2017/0140201 | A1 | 5/2017 | Li et al. |
| 2017/0336906 | A1 | 11/2017 | Yoon et al. |
| 2017/0344141 | A1* | 11/2017 | Lee ........................ G06F 3/0448 |
| 2018/0025203 | A1 | 1/2018 | Lee et al. |
| 2018/0314363 | A1 | 11/2018 | Yoon et al. |
| 2019/0369799 | A1 | 12/2019 | Jeon et al. |

FOREIGN PATENT DOCUMENTS

| | | |
|---|---|---|
| EP | 1469416 | 10/2004 |
| WO | 01/59558 | 8/2001 |
| WO | 2004/036484 | 4/2004 |
| WO | WO 2018/124334 | 7/2018 |
| WO | WO 2018/222866 | 12/2018 |

OTHER PUBLICATIONS

Search & Exam Report issued in Appl. No. GB1907998.7 (Aug. 6, 2019).
Search & Exam Report issued in Appl. No. GB2008505.6 (Nov. 24, 2020).
Search Report & Written Opinion issued in Appl. No. PCT/GB2020/051373 (Oct. 5, 2020).
Third Party Observations issued in GB2008496.8 (Dec. 17, 2021).
Examination Report issued in EP20739761.3 (Oct. 13, 2023).

* cited by examiner

BIOMETRIC SKIN CONTACT SENSING APPARATUS AND METHOD

CROSS-REFERENCE TO RELATED APPLICATIONS

This application is a US National Stage Application under Section 371 of PCT/GB2020/051373, filed on Jun. 5, 2020, which claimed priority from the following four (4) United Kingdom patent applications: 1907998.7, filed on Jun. 5, 2019; 1908040.7, filed on Jun. 5, 2019; 1909209.7, filed on Jun. 26, 2019; and 1913912.0, filed on Sep. 26, 2019, the entirety of each are hereby fully incorporated by reference herein.

TECHNICAL FIELD

The present disclosure relates to the field of sensors. In particular, biometric sensors for sensing skin contact.

BACKGROUND

Secure, verifiable authentication, of user identity is an increasingly important part of all technology. To give just a few examples, it plays a part in:

user equipment UE used for communication and consumer access to media content,
computer devices and systems which store and provide access to sensitive data,
devices and systems used for financial transactions,
access control for buildings, and
access control for vehicles.

Biometric measurement of the user is now prevalent in all of these contexts and others. Biometric measures such as iris scanning, and facial recognition are dependent on lighting and field of view of a camera. It may also be possible to circumvent such security measures by presenting a video or photo of the user to the camera.

Fingerprint sensors have been thought of as being more secure, but it is possible also to overcome the security they provide. The manufacturing requirements of such sensors makes it difficult to integrate them into other electronic devices such as mobile telephones and other UEs. In particular, fingerprint sensing demands very high resolution—at least hundreds of pixels per inch.

One example of such a sensor is Apple Inc's Touch ID®. This sensor is based on a laser-cut sapphire crystal. It uses a detection ring around the sensor to detect the presence of the user's finger. The Touch ID® sensor uses capacitive touch sensing to detect the fingerprint, and has a 500 pixel per inch (PPI) resolution.

Capacitance sensors such as these use capacitive effects associated with the surface contours of the fingerprint. The sensor array pixels each include an electrode which acts as one plate of a capacitor, the dermal layer (which is electrically conductive) acts as the other plate, and the non-conductive epidermal layer acts as a dielectric. A thin insulator coating on the sensor may also act as a dielectric. Two insulating layers may therefore be provided between the two electrodes. The capacitance is greater where the dermis is closer to the pixel electrode, and so the surface contours of the skin can be sensed by measuring the capacitance of each pixel (e.g. based on the charge accumulated on the pixel electrode) and assembling an image from those pixels.

Both passive matrix and active matrix capacitive touch sensors have been proposed. Most so-called passive capacitive touch sensing systems use an external driving circuit (such as an integrated circuit, IC) to drive a matrix of passive electrodes, and a separate readout circuit (e.g. an IC) to readout charge stored on these electrodes during the drive cycle. The stored charge varies dependent on the tiny capacitance changes due to touch events. Passive electrode systems are sensitive to environmental noise and interference.

Active matrix capacitive touch sensors include a switching element in each pixel. The switching element may control a conduction path between the capacitive sensing electrode in the pixel, and an input channel (such as an analog front-end circuit) to an analogue to digital converter (ADC) in a read-out circuit. Typically each column of pixels in an active array is connected to one such input channel. The charge stored in the array can thus be read from the active matrix by controlling the switching elements to connect each row of pixels, one-by-one, from the input channel to the ADC.

Each pixel needs to be connected to the read-out circuit, and all of the pixels of each column are effectively connected in parallel. The parasitic capacitance associated with each pixel therefore combines additively. This places an inherent limit on the number of pixels that can be combined together in any one column. This in turn limits the size and/or resolution of a capacitive touch sensor.

There thus remains a significant unmet commercial need for large area high resolution touch sensors.

SUMMARY

As set out above, there are numerous advantages available if a large area high resolution touch sensor could be manufactured. The present inventors have devised such enabling technology, which is also described in pending patent applications GB1903093.1 and GB1907998.7. In particular, such technology enables the provision of a large area high resolution biometric skin-contact sensor which may be formed on either a planar or curved substrate. Aspects of the present disclosure may enable the provision of more energy efficient and/or faster (e.g. quicker) biometric skin-contact sensors, and which may find particular application for large scale sensors, and/or sensors for which a user is likely to contact the sensor in a number of different locations or in a non pre-prescribed way.

Aspects of the disclosure are set out in the independent claims and optional features are set out in the dependent claims. Aspects of the disclosure may be provided in conjunction with each other, and features of one aspect may be applied to other aspects.

In an aspect, there is provided a biometric skin-contact sensor comprising: (i) a contact sensing area comprising an array of pixels, each pixel comprising a thin film transistor and a capacitive sensing electrode for sensing contact; and (ii) a controller coupled to the contact sensing area and configured to operate the array of pixels to switch between a low resolution mode and a high resolution mode. In the low resolution mode the sensor is operable to obtain contact location data comprising an indication of a sub-region of the contact sensing area in which contact is sensed. In the high resolution mode the sensor is operable to obtain biometric data for skin interacting with the contact sensing area by identifying a difference in capacitance between valleys and ridges of the skin.

Embodiments of the present disclosure may enable faster sensing to occur, e.g. for biometric data to be obtained quicker, as time-consuming biometric scanning may be confined to sub-regions of the sensor where it may obtain the most useful data. Embodiments of the present disclosure may enable more energy efficient sensing to occur, e.g. for biometric data to obtained using less energy, as more energy-consuming biometric scanning may be confined to sub-regions of the sensor where it may obtain the most useful data. Pixel operation in other sub-regions may be controlled (e.g. limited) to enable quicker/more efficient operation of the overall array.

Contact location data may comprise an indication of a capacitance measured by an activated pixel in the array. Contact location data may comprise an indication of a capacitance measured by a number of activated pixels in the array. For example, using multiple activated pixels may reduce noise sensitivity and/or increase accuracy. In the event that the indicated capacitance is considered to be above a threshold level, this may be considered to be an indication of contact. The contact location data may comprise an indication of activated pixels for which contact has been sensed, such as an indication of the locations of such activated pixels. The sub-region may be a part, but not a whole, of the array. The low resolution mode may comprise a low energy mode. The high resolution mode may comprise a high energy mode. Resolution may provide an indication of the accuracy and/or energy expenditure of the operation of the array of pixels. Biometric data for skin for a user in contact with, or proximal to, the sensor may provide data from which the user may be identified based on previous data associated with that user.

The controller may be configured to switch from the low resolution mode to the high resolution mode in the event that contact is sensed in the low resolution mode. For example, in response to sensing contact, the sensor may trigger operation in the high resolution mode, e.g. such that, for a subsequent scan of the array, operation will be in the high resolution mode. The controller may be configured to switch from the high resolution mode to the low resolution mode in the event that contact is not sensed in the high resolution mode. For example, in response to sensing no contact (or an absence of contact), the sensor may trigger operation in the low resolution mode, e.g. such that, for a subsequent scan of the array, operation will be in the low resolution mode. When switching from low to high, operation of the array may be controlled to minimise a time delay between subsequent scans. When switching from high to low, a threshold time may be elapsed, such as to reduce energy consumption. When in the low resolution mode, the sensor may be controlled to provide a threshold time delay between subsequent scans, e.g. to reduce energy consumption for the sensor.

The controller may be configured to select a first sub-region of the contact sensing area based on the obtained contact location data. The first sub-region may comprise pixels for which it is determined that there is a likelihood of sufficient skin contact to provide biometric data suitable for identifying the user. The first sub-region may include pixels for which contact is sensed and pixels near to those pixels. The first sub-region may define an area as large as a fingerprint and/or it may define an area with a selected height and width number of pixels.

In the high resolution mode the sensor may be configured to operate at a high resolution in the first sub-region and a lower resolution in at least one region of the contact sensing area outside the first sub-region. For example, the sensor may operate at the lower resolution in the rest of the array (apart from the first sub-region). Operating at the lower resolution may comprise at least one of: (i) operating at a resolution used when in the low resolution mode; (ii) obtaining no data from the at least one region of the contact sensing area outside the first sub-region. In the high resolution mode, operation at the higher resolution may be at least one of: (i) temporally and/or (ii) spatially interleaved with operation at the lower resolution. Temporally interleaving may comprise operating in one mode for the relevant pixels, and then operating in the other mode for the other pixels, e.g. selecting the pixels to be operated depending on the mode of operation. Spatially interleaving may comprise operating in both modes at the same time, e.g. selecting the mode of operation depending on the pixel to be operated.

Obtaining contact location data may comprise using only a subset of the pixels in the array to sense contact. For example, operation in the low resolution mode may be confined to only said subset of the pixels in the array. Using only a subset of the pixels may comprise skipping operation of selected rows and/or columns in the array. For example, the number of pixels operated may be reduced. This reduction may be provided by reducing the number of rows and/or columns in the array which are operated, e.g. for one scan.

The controller may be configured to determine whether the sub-region in which contact is sensed is moving based on the obtained contact location data. For example, the sensor may determine that skin in contact with the sensor is moving along the sensor. The controller may be configured to control, based on determined movement of the sub-region in which contact is sensed, at least one of: (i) a frequency, (ii) a resolution, (iii) an operation time, (iv) an area of operation, of the operation of the array of pixels, and/or (v) a number of simultaneously addressed rows. The area of operation may comprise a number of rows and/or columns in which operation occurs. The number of simultaneously addressed rows includes the number of rows for which gate drive pulses are simultaneously applied, with read-outs being taken from (e.g. where one read-out for a column includes a read-out from more than one pixel in that column). This may occur in both high and low resolution modes. The controller may be configured to select the first sub-region based also on the determined movement of the sub-region in which contact is sensed, e.g. to take into account the movement of the skin on the sensor, so that the region of the sensor for which biometric data is obtained may be selected to allow for this movement.

The controller may be configured to select the first sub-region based also on data for a body part associated with the skin interacting with the contact sensing area. For example, the sensor may be associated with body parts known to interact with that sensor, and the first sub-region may be selected based on these known body parts. The selected sub-region may be selected based on regions of the known body part for which obtained biometric data may be more useful.

The controller may be configured to control the sensor to sequentially obtain: (i) first contact location data comprising an indication of a first sub-region of the contact sensing area in which contact is sensed, and then (ii) second contact location data comprising an indication of a second sub-region of the contact sensing area in which contact is sensed. The controller may be configured to determine, based on the first and second sub-regions, an indication of pressure applied to the contact sensing area. The controller may be configured to determine the indication of pressure based on a difference in area for the first and second sub-regions. For example, pressure may be determined based on a ratio of initial and final cross-sectional areas (e.g. first and second cross-sectional areas corresponding to first and second contact locations/selected sub-regions).

The pixels included in the subset of pixels activated in the low resolution mode may be selected to provide at least one of: (i) a selected shape for clusters of pixels in the array, (ii) a selected distribution of pixels about the array, and/or (iii) a selected number of columns from which simultaneous read-outs are taken. Clusters of pixels may comprise pixels directly adjacent to, or proximal to, one another. The shape may comprise the distribution of the pixels in this cluster. The selected distribution of pixels may be based around a central point. The central point may be in the centre of the pixel array. Pixel density may be lower in regions of the sensor further away from the centre than in regions closer to the sensor. Pixels may be activated to enable multiple simultaneous read-outs to be taken. That is, pixels may be grouped to facilitate a reduction in the number of rows to be addressed, or the number of columns from which a read-out is to be taken.

The controller may be configured to select the first sub-region based also on at least one of: (i) a size, (ii) a shape and/or (iii) a pressure, of the skin interacting with the contact sensing area.

The sub-region of the contact sensing area in which contact is sensed may comprise a plurality of separate sub-regions of the contact sensing area. The controller may be configured to select a plurality of first sub-regions, each first sub-region being associated with a respective sub-region of the contact sensing area in which contact is sensed.

The controller may be configured to select the first sub-region so that it encompasses the entirety of the contact sensing area in which contact is sensed. The controller may be configured to select the first sub-region so that it includes a border region around the area in which contact is sensed.

The controller may be configured to control operation of the array of pixels to at least one of: (i) switch to a third mode in the event that a resolution used in the high resolution mode is below a first selected threshold, and (ii) switch to a fourth mode in the event that a resolution used in the high resolution mode is above a second selected threshold. The sensor may be operable to be connected to a computer (such as a micro-controller) to receive a signal from a said computer indicating a desired functionality for the sensor. The controller may be configured to control operation of the array of pixels to select a mode of operation based on the received signal.

In an aspect, there is provided a method of operating a biometric skin-contact sensor comprising a contact sensing area comprising an array of pixels, each pixel comprising a thin film transistor and a capacitive sensing electrode for sensing contact (such as at least one thin film transistor and/or at least one capacitive sensing electrode). The method comprises switching between low and high resolution modes of operation. In the low resolution mode the sensor is operable to obtain contact location data comprising an indication of a sub-region of the contact sensing area in which contact is sensed. In the high resolution mode the sensor is operable to obtain biometric data for skin interacting with the contact sensing area by identifying a difference in capacitance between valleys and ridges of the skin.

In an aspect, there is provided a method of operating a biometric skin-contact sensor comprising a contact sensing area comprising an array of pixels, each pixel comprising a thin film transistor and a capacitive sensing electrode for sensing contact. The method comprises: (i) operating the array in a low resolution mode to obtain an indication of a sub-region of the contact sensing area in which contact is sensed; and (ii) operating the array in a high resolution mode to obtain biometric data for skin interacting with the contact sensing area in a first sub-region selected based on the sub-region of the contact sensing area in which contact is sensed.

In an aspect, there is provided a method of operating a biometric skin-contact sensor comprising a contact sensing area comprising an array of pixels, each pixel comprising a thin film transistor and a capacitive sensing electrode for sensing contact, wherein the sensor is operable to obtain biometric data for skin interacting with the contact sensing area by identifying a difference in capacitance between valleys and ridges of the skin. The method comprises: (i) receiving a signal from a computer to which the sensor is connected indicating that obtaining biometric data is not desired; and (ii) controlling the array to operate in a low resolution mode to obtain an indication of a sub-region of the contact sensing area in which contact is sensed.

The contact sensing area may comprise an array of pixels, each pixel comprising a thin film transistor ('TFT'). The array of pixels may comprise a TFT array. The TFT of the biometric skin-contact sensor may be disposed on an inside surface of a dielectric which provides at least a part of an operation interface of the sensor, such as the contact sensing area. Each pixel of the TFT array may comprise a capacitive sensing electrode for sensing skin-contact with an outside surface of the dielectric. The capacitive sensing electrode may be disposed on the inside surface of the dielectric. Each pixel may comprise a sense TFT. The capacitive sensing electrode may be connected to a gate electrode of the sense TFT.

Each capacitive sensing electrode may be provided by a first metal layer of a thin film structure. The first metal layer may be disposed between capacitive sensing electrode and at least one TFT of each pixel. The dielectric may be at least one of (a) flexible, and (b) curved. The dielectric may provide a cover layer for the TFT stack and the capacitive sensing electrode, such that the dielectric lies between said components and a contact surface for contact by the operator. Interaction between the user and the biometric skin-contact sensor may therefore comprise contact with the dielectric of the skin-contact sensor. The TFT stack may be provided on a substrate, which may itself be provided by a dielectric material. The substrate may be formed of the same dielectric material as the dielectric. The substrate may provide the contact surface for contact by the operator. For example, a TFT stack may be deposited on the substrate/contact surface.

For example, the biometric skin-contact sensor may comprise a sensor array which comprises a plurality of touch sensitive pixels. Each pixel comprises: a capacitive sensing electrode for accumulating a charge in response to proximity of a conductive object to be sensed; a reference capacitor connected in series with the capacitive sensing electrode so that, in response to a control voltage, an indicator voltage is provided at the connection between the reference capacitor and the capacitive sensing electrode to indicate the proximity of the conductive object to be sensed. Each pixel comprises a TFT. This arrangement may reduce or overcome the problem associated with parasitic capacitance which may occur in prior art touch sensors.

Each pixel may comprise a sense VCI (voltage controlled impedance) having a control terminal connected so that the impedance of the sense VCI is controlled by the indicator voltage. Typically the sense VCI comprises at least one TFT (thin film transistor) and the conduction path of the VCI comprises the channel of the TFT. A conduction path of the sense VCI may be connected to a first plate of the reference capacitor, and the control terminal of the first VCI is connected to the second plate of the reference capacitor. At least one plate of the reference capacitor may be provided by a metallisation layer of a thin film structure which provides the sense VCI.

The conduction path of the sense VCI may connect the first plate of the reference capacitor, and so also the control voltage, to an input of a readout circuit. This may enable the circuitry which provides the control voltage also to provide the basis for the output signal of the pixel. This may further address problems associated with parasitic capacitance and signal to noise ratio in prior art touch sensors. An alternative way to address this same problem is to arrange the conduction path of the sense VCI to connect a reference signal supply to an input of a readout circuit. The reference signal supply may comprise a constant voltage current source. Thus, modulating the impedance of the sense VCI of a pixel controls the current from that pixel to the input of the read-out circuit.

A select VCI may also be included in each pixel. This may be connected so that its conduction path is connected in series between the conduction path of the sense VCI and the reference signal supply. Thus, switching the select VCI into a non-conducting state can isolate the sense VCI from the reference signal input, whereas switching the select VCI into a conducting state can enable current to flow through the pixel (depending on the impedance of the sense VCI). A control terminal of the select VCI may be connected for receiving the control voltage, e.g. from a gate drive circuit.

Each pixel may comprise a gate line VCI, and a conduction path of the gate line VCI may connect the reference signal supply to the first plate of the reference capacitor for providing the control voltage.

Each pixel may comprise a reset circuit for setting the control terminal of the sense VCI to a selected reset voltage. The reset circuit may comprise a reset VCI. A conduction path of the reset VCI is connected between a second plate of the reference capacitor and one of (a) a reset voltage; and (b) a first plate of the reference capacitor. A control terminal of the reset VCI may be connected to another pixel of the sensor for receiving a reset signal (e.g. from a channel of a gate drive circuit which is connected to the control terminal of the select VCI of a pixel in another row of the array). The reset signal may be configured to switch the reset VCI into a conducting state, thereby to connect the second plate of the reference capacitor to the one of (a) the reset voltage and (b) the first plate of the capacitor. Connecting the second plate of the reference capacitor to the one of (a) the reset voltage.

For example, the sensor array comprising a plurality of touch sensitive pixels may be made up of pixels having a pixel structure comprising a plurality of layers for providing a touch sensitive pixel. Each said pixel may comprise: a thin film transistor; and a capacitive sensing electrode coupled to the thin film transistor and disposed on a dielectric shield to be touched by an object to be sensed. The dielectric shield may provide a substrate on which the layers of the structure are disposed; for example the dielectric shield may be the substrate. The capacitive sensing electrode may be deposited on the substrate. The dielectric shield may comprise a first surface to be touched by the object to be sensed. The capacitive sensing electrode may be disposed on a second surface of the dielectric shield.

An insulating layer may separate the capacitive sensing electrode from the thin film transistor. The insulating layer between the capacitive sensing electrode and the thin film transistor may act to avoid shorting between the two features.

The capacitive sensing electrode may be connected to the thin film transistor by a conductive via through the insulating layer. The via advantageously provides an electrical connection between the layers of the pixel, in particular it may provide a connection between the capacitive sensing electrode and an element of the thin film transistor.

A source-drain layer of the pixel structure may comprise a source region and a drain region of the thin film transistor. The source-drain layer can be a metalized, conductive layer. The source and drain regions may comprise islands of the deposited metal, and may be simultaneously deposited. Simultaneous deposition maintains that the material of the source-drain layer is constant and aids simplicity of manufacturing. Patterning can be used to ensure the source and drain regions are separate.

The pixel may further comprise a channel region comprising a semiconductor, which connects the source region and the drain region of the thin film transistor in an "on" state (e.g. the channel region is conductive, such as with a low-ohmic connection). The channel region may be referred to as an active region. In an "off" state, i.e. when there is no current applied to the pixel, the source and drain regions remain non-conductive (e.g. ohmically unconnected, or with a relatively high-ohmic connection) by virtue of the (non-conductive) channel region.

The source-drain layer may connect to an output of the pixel. This may be a data line or a source line such that the pixel can be read-out. Pixels may be addressed (e.g. selected) on a line-by-line basis by the gate driver (e.g. gate line).

The pixel structure may further comprise a gate layer of the pixel structure comprising a gate region of the thin film transistor. This may be a second metalized, conductive layer. The gate layer may be separated from the source-drain layer and the channel region by a gate-insulator layer disposed between the gate layer and the channel region. Thus, the TFT may comprise a source-drain region, an active region provided by the channel region, a gate-insulator layer and a gate region.

The gate layer may be disposed between the capacitive sensing electrode and the source-drain layer, for example, in a bottom gate arrangement. Or, the source-drain layer may be disposed between the capacitive sensing electrode and the gate layer in a top gate arrangement. Either arrangement can be used, the difference between the two is the method of manufacture, there is little functional difference between the two configurations.

The conductive via may connect the capacitive sensing electrode to the TFT.

The pixel structure may further comprise a reference capacitor. A reference capacitor can be connected in series with the capacitive sensing electrode so that, in response to a control voltage, an indicator voltage is provided at the connection between the reference capacitor and the capacitive sensing electrode to indicate the proximity of the conductive object to be sensed. This arrangement may reduce problems associated with parasitic capacitance which may occur in prior art touch sensors. The reference cap may further enable touch capacitive measurement.

The pixel structure comprising a reference capacitor may be arranged such that at least one of the source-drain layer and the gate layer are arranged to provide a plate of the reference capacitor. To complete the circuitry of an individual pixel, such that it may be individually addressed, the reference capacitor plates can be arranged to be integrated by virtue of simultaneous deposition with the metalized layers of the TFT.

In an aspect, there is provided a contact sensor. The contact sensor comprises a sensing surface arranged to sense contact from a body contacting the sensing surface. The contact sensor also includes a controller coupled to the sensing surface and configured to operate contact sensing of the sensing surface to switch between a low resolution mode and a high resolution mode. Wherein in the low resolution mode the sensor is operable to obtain first contact location data comprising an indication of a sub-region of the sensing surface in which contact is sensed. Wherein in the high resolution mode the sensor is operable to obtain second contact location data comprising an indication of a sub-region of the sensing surface in which contact is sensed. The second contact location data is of a higher resolution than the first contact location data. The controller is configured to control the sensor to switch from the low resolution mode to the high resolution mode in the event that first contact location data is obtained which indicates contact with a first sub-region of the sensing surface, wherein operation in the high resolution mode is in a selected sub-region of the sensing surface, said selected sub-region being based on the first sub-region.

In an aspect, there is provided a method of operating a contact sensor. The contact sensor comprises a sensing surface arranged to sense contact from a body contacting the sensing surface. The sensor is operable in a low resolution mode and a high resolution mode. Wherein in the low resolution mode the sensor is operable to obtain first contact location data comprising an indication of a sub-region of the sensing surface in which contact is sensed. Wherein in the high resolution mode the sensor is operable to obtain second contact location data comprising an indication of a sub-region of the sensing surface in which contact is sensed. The second contact location data is of a higher resolution than the first contact location data. The method comprises switching from the low resolution mode to the high resolution mode in the event that first contact location data is obtained which indicates contact with a first sub-region of the sensing surface, wherein operation in the high resolution mode is in a selected sub-region of the sensing surface, said selected sub-region being based on the first sub-region.

It is to be appreciated that although examples described herein include a pixel array with each pixel having a TFT and a capacitive sensing electrode, other sensors may be used. For example, other sensors may be used which do not provide biometric skin-contact sensing. These sensors may measure other parameters such as pressure. Embodiments may find application in situations in which high precision measurements may be taken without requiring high precision operation of an entire sensing surface. For example, this may find application with touchpads, touch screens (such as on a tablet), scales and other weighing/pressure sensing equipment. Features relating biometric skin-contact sensors and methods of using them described herein may be combined with other aspects of the disclosure in which sensors may not be biometric skin-contact sensors.

Aspects of the present disclosure provide computer program products comprising computer program instructions configured to program a processor to perform any method disclosed herein.

FIGURES

Some embodiments will now be described, by way of example only, with reference to the figures, in which.

In the drawings like reference numerals are used to indicate like elements.

SPECIFIC DESCRIPTION

Embodiments of the present disclosure provide a biometric skin-contact sensor made up of an array of pixels. The sensor may work in different modes of operation to control power consumption. In a low resolution mode, less power is consumed, but the sensor is still operable to identify sub-regions of the sensor which a user has contacted. In a high resolution mode, more power is consumed, and the sensor may be used to obtain biometric data for skin in contact with the sensor. Operation of the sensor is controlled to inhibit high power operation outside of sub-regions of the sensor in which biometric data may be obtained from a user's skin. Low resolution mode sensing may be used to identify contacted sub-regions, and high resolution mode sensing may be performed in such contacted sub-regions. Low and high resolution mode sensing may occur simultaneously so that in the contacted sub-regions biometric data may be obtained, whilst other contacted sub-regions may be identified. Embodiments may find particular application in large area sensors, where overall power consumption and/or the time taken to obtain data from the sensor may be reduced while still providing high resolution detection in relevant sub-regions of the sensor.

One specific example of a biometric skin-contact sensor, and its operation, will now be described with reference to FIGS. 1 and 2.

Figure 1A:
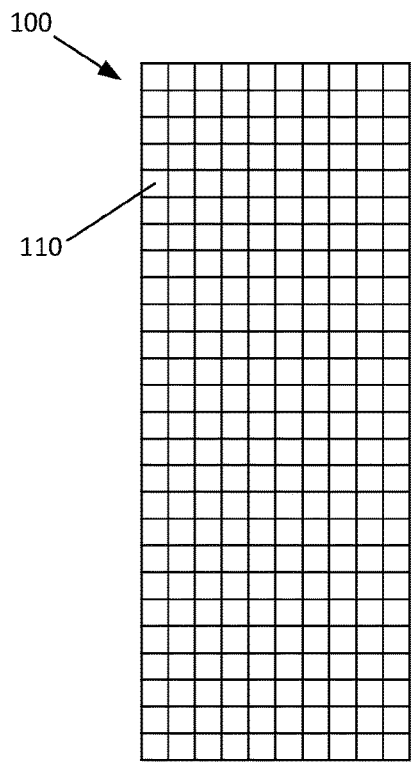
FIGS. 1a to 1f show schematic diagrams of use of an example biometric skin contact sensor.

FIG. 1a shows a contact sensing area of a biometric skin-contact sensor 100. The sensor 100 includes an array of pixels 110. As shown, the array is rectangular with 26 rows and 10 columns. Each pixel 110 of the array includes a thin film transistor and a capacitive sensing electrode for sensing contact. Examples of the pixels 110, and their array, are discussed in more detail below.

Each of the pixels 110 may be operated to provide an output signal from which contact may be sensed. The output signal from a pixel 110 may indicate the charge stored on the capacitive sensing electrode of that pixel 110. For example, this output signal may have a voltage from which the charge stored on the capacitive sensing electrode of that pixel 110 may be determined. This output signal may provide an indication of capacitance, e.g. based on a voltage of this output signal, an indication of capacitance may be determined.

In one example pixel structure described in more detail below, a gate drive pulse may be applied to a pixel 110. This pixel 110 may provide an output signal. This output signal is provided to an input channel of a read-out circuit. Applying a gate drive pulse to this pixel 110 may comprise applying a control voltage to the pixel 110. The pixel 110 may comprise a reference capacitor. For example, the control voltage may be applied to a first plate of the reference capacitor of that pixel 110. The relative division of that control voltage between a capacitive sensing electrode of the pixel 110 and the reference capacitor of that pixel 110 may provide an indicator voltage. Based on that indicator voltage, an output signal may be provided from the pixel 110. This output signal may be used to determine the charge stored on the capacitive sensing electrode of that pixel 110. This output signal (e.g. indication of capacitance) may be used to determine proximity of a surface of a conductive object (e.g. a user's skin) to the capacitive sensing electrode.

In the array of pixels, a gate drive pulse is applied to one row of pixels at a time. A read-out based on an output signal for that pixel 110 is measured. For each row, a read-out is taken from selected columns of pixels. This read-out may be taken by all selected columns at the same time, e.g. it may be multiplexed, or it may be taken sequentially for subsequent columns. Multiplexing may involve dividing a full row into smaller sections and using a time multiplexed principle. The sensor 100 is operable to control to which rows the gate drive pulse is applied, as well as, from which columns a read-out is measured. The sensor 100 may perform one 'scan' by sequentially transmitting gate drive pulses to selected rows in the array. For each selected row, read-outs are taken from selected columns. An activated pixel is one lying on both a selected row and a selected column. For one scan, data is obtained from each activated pixel once. The sensor 100 (e.g. a controller for/of the sensor) is operable to select which the activated pixels will be. This process may then be repeated to perform another scan. For each scan, the number and/or selection of the activated pixels may be controlled (e.g. the selected rows and/or columns may change).

The output signal (e.g. indication of the charge stored on the capacitive sensing electrode of a pixel) for an activated pixel may therefore indicate the proximity of a body (e.g. skin of a user) to the pixel. A change in the output signal (e.g. a change in the charge stored on the capacitive sensing electrode of a pixel) may therefore indicate a change in the proximity of the body to the pixel. Based on a magnitude of the charge stored on the capacitive sensing electrode of the pixel, a sub-region of the contact sensing area with which a user is in contact may be identified. The pixels are small enough and/or positioned sufficiently close together to enable valleys and ridges of a user's skin in contact with the sensor 100 to be identified based on the indications of charge stored on the capacitive sensing electrode obtained from those pixels. Using these valleys and ridges (e.g. contours) of a user's skin, biometric data may be provided which enables identification of the user whose skin is in contact with the sensor 100, for example by comparison with stored biometric data.

A method of operating the sensor 100 will now be described with reference to FIGS. 1*b* to 1*f* and 2.

Figure 2:
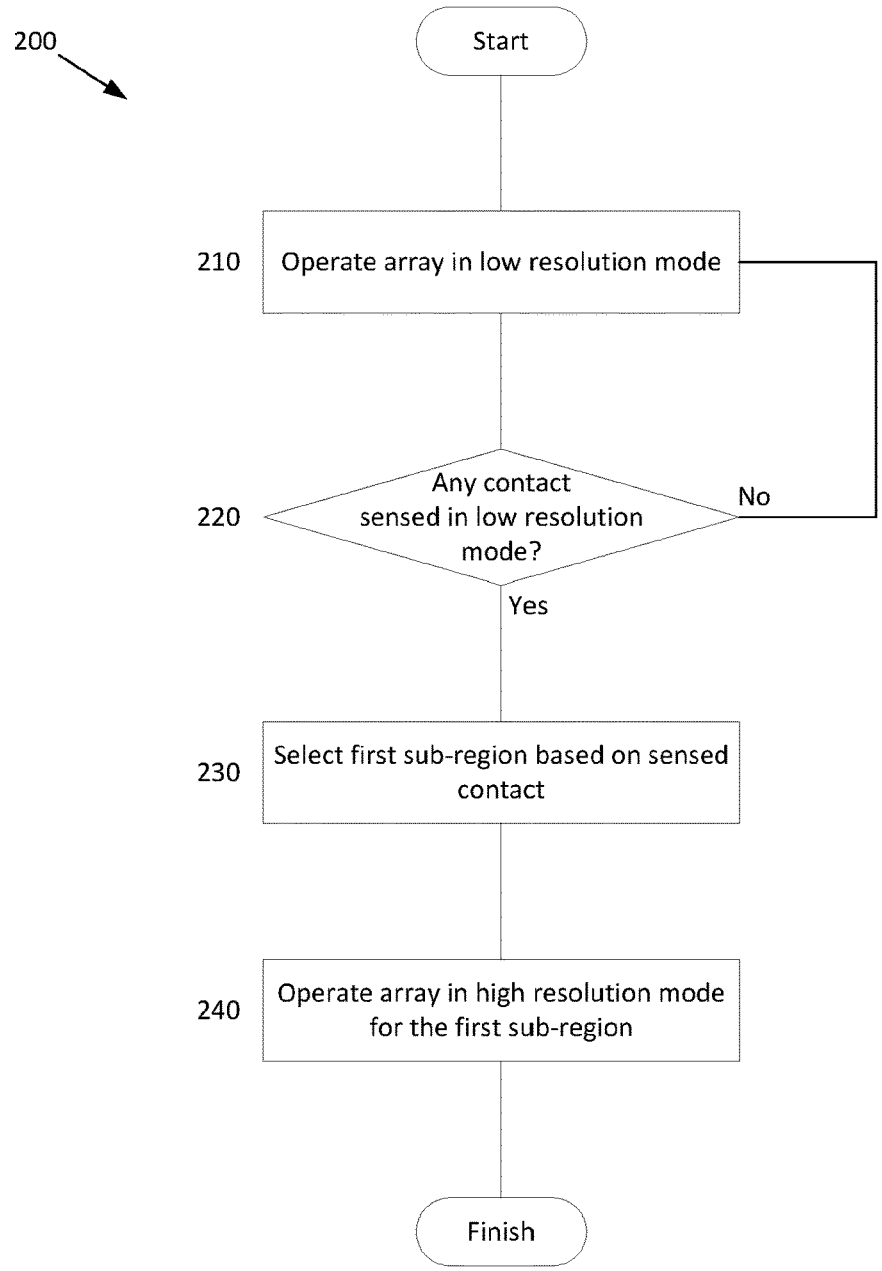
FIG. 2 shows a flow chart for an example method of use of a biometric skin contact sensor.

FIG. 2 illustrates a flow chart for a method 200 of operating a sensor of the type described above.

At step 210, the array of pixels in the sensor 100 are operated in a low resolution mode. In the low resolution mode, only some of the pixels are activated whilst others remain inactive. In the low resolution mode, one scan of the array of pixels comprises applying a gate drive pulse to a subset of the rows in the array, and measuring the read-out from a subset of the columns of those rows. The subset of rows and columns is selected so that activated pixels provided by this selection are distributed uniformly across the array of pixels.

Figure 1B:
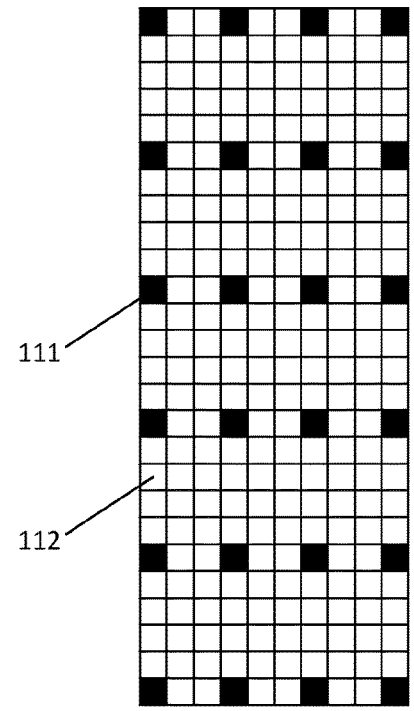

Operation in the low resolution mode is illustrated in FIG. 1*b*, which shows a plurality of activated pixels 111 and a plurality of non-activated pixels 112. The activated pixels 111 are illustrated as black filled-in squares, and the non-activated pixels 112 are illustrated as squares with no fill. In the low-resolution mode, a gate drive pulse is applied to only some of the rows (every fifth row as shown), and a read-out is taken from only some of the columns (every third column as shown). This is applied uniformly across the array of pixels. For each of the activated pixels 111, an indication of charge stored on the capacitive sensing electrode of the pixel 111 is obtained. This indicated charge is used to provide an indication of whether or not contact is sensed by that pixel 111. This is because, if a portion of a user's skin is in contact with (or proximal to) a pixel of the array, an increase in charge stored on the capacitive sensing electrode should be sensed by that pixel (or pixels near to it). Scanning in the low resolution mode may also be performed at a lower frame frequency than scanning in the high resolution mode.

As step 220 in the method shown in FIG. 2, it is determined whether any contact has been sensed. It will be determined that contact has been sensed if a read-out for any one of the activated pixels 111 provides an indicated stored charge representative of contact (e.g. above a threshold value). If no contact is sensed across the entire array of pixels, the method returns to step 210, where the array is again operated in the low resolution mode. This comprises performing another scan of the array and observing charge values from the activated pixels 111. If contact is sensed at step 220, the method proceeds to step 230.

At step 230, a first sub-region of the array of pixels is selected. This sub-region is selected based on the activated pixels 111 in the array from which a charge representative of contact was obtained. This process of selecting a sub-region will now be described with reference to FIGS. 1*c* to 1*e*.

Figure 1C:
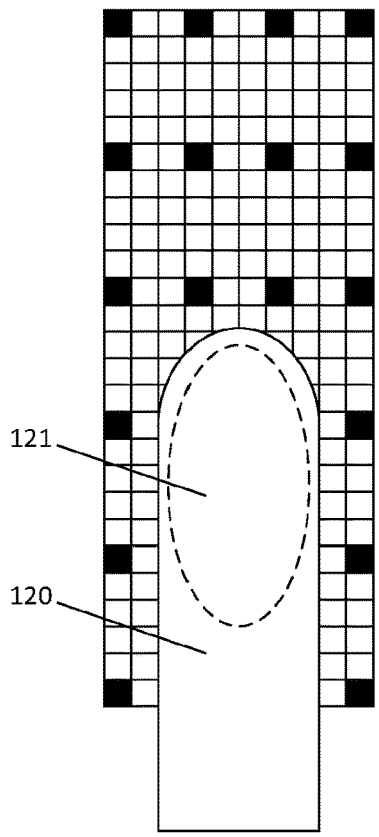

FIG. 1*c* shows a user's finger 120 which is interacting with the sensor 100. A contact portion 121 of the user's finger 120 is shown with a dashed line. The contact portion 121 will be on the underside of the user's finger 120 as viewed in FIG. 1*c*. That is, it is on the side of the user's finger 120 facing the sensor 100. The contact portion 121 is a portion of the user's finger 120 which is touching, or is close enough to, the sensor 100 so that charges provided by activated pixels 111 in the corresponding region of the array indicate contact with the sensor 100.

Figure 1D:
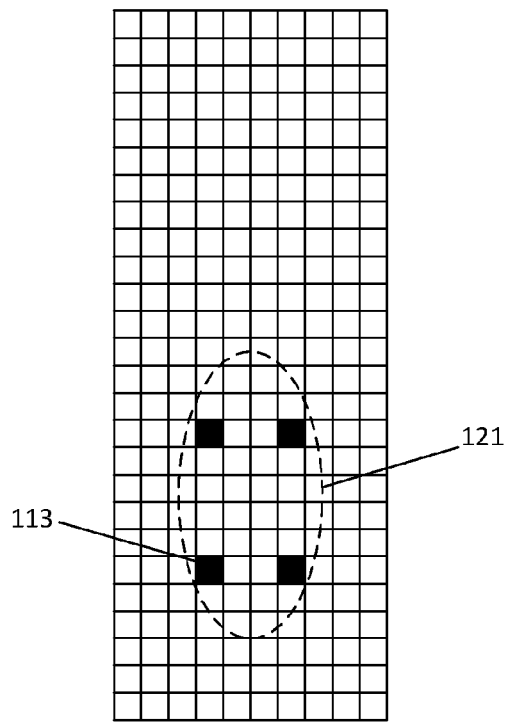

FIG. 1*d* shows the contact portion 121 of the user's finger 120 as a dashed line superimposed over the array of pixels. Only the activated pixels 111 lying within this contact portion 121 are shown in FIG. 1*d*. These will be referred to hereinafter as contacted pixels 113, as these are the activated pixels 111 which provided an output signal indicating a charge indicative of contact in response to the user placing their finger 120 on the sensor 100. As can be seen in FIG. 1*d*, there are four contacted pixels 113 in this region.

Figure 1E:
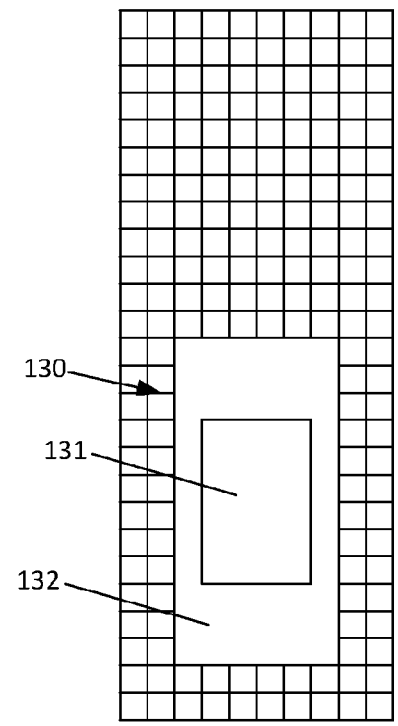

FIG. 1e shows how, on the basis of the four contacted pixels 113 shown in FIG. 1d, a sub-region of the array of pixels is selected. A selected first sub-region 130 is shown, which is made up of a core region 131 and a border region 132.

The core region 131 encompasses all of the contacted pixels 113. It also encompasses all of the non-activated pixels 112 lying in between the contacted pixels 113. The core region 131 is rectangular. It encompasses a rectangle of pixels stretching from the left-most contacted pixel to the right-most contacted pixel, as well as from the top-most contacted pixel to the bottom-most contacted pixel.

The border region 132 is a perimeter around the core region 131. It has a size selected to encompass some additional non-activated pixels 112 which lie between contacted pixels 113 and non-contacted activated pixels 111 near to those contacted pixels 113. The border region 132 shown in FIG. 1e extends horizontally by one pixel in both directions, and vertically by three pixels in both directions. The border region 132 therefore encompasses some additional non-activated pixels 112 surrounding the core region 131. These may include some pixels which, if they had previously been activated, would have also registered a charge indicative of contact in response to the user placing their finger 120 on (or near to) the sensor 100. This can be seen in comparison with FIG. 1d which shows the contact portion 121 extending beyond the four activated pixels.

The first sub-region 130 is selected to encompass both the core region 131 and the border region 132. The method of FIG. 2 then proceeds to step 240.

Figure 1F:
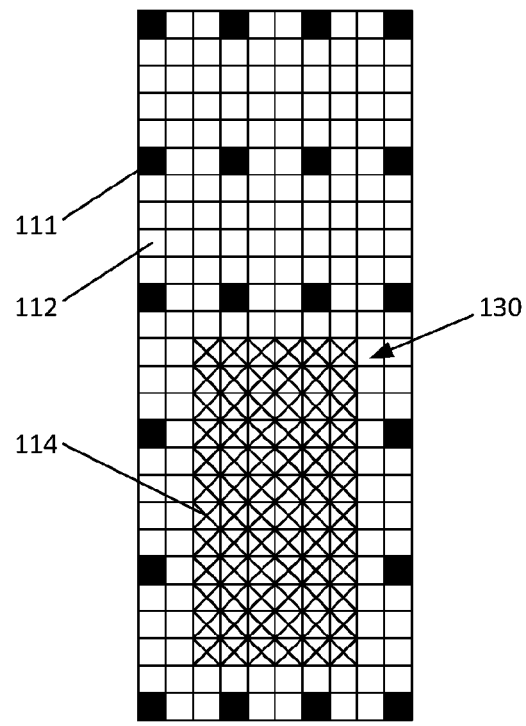

At step 240, the array is operated in a high resolution mode. In the high resolution mode all pixels in the selected first sub-region 130 are activated. That is, activated pixel density in the first sub-region 130 is increased. In this case, it is increased to 100% of the possible available pixel density. This is illustrated in FIG. 1f, which shows the array of pixels with the first selected sub-region 130 having all of its pixels in their activated state. These will hereinafter be referred to as sub-region pixels 114, and they are shown as pixels with crosses in. In the high resolution mode, all of the sub-region pixels 114 are activated, but outside the selected first sub-region 130, the pixels are operated as in the low resolution mode. That is, some of the pixels outside the first selected sub-region 130 are activated pixels 111, and the remainder are non-activated pixels 112.

The sensor 100 is operated so that using the sub-region pixels 114, output signals are obtained which provide an indication of charge which spans over the area of the selected first sub-region 130 (e.g. each pixel in that area provides an output signal). Across the area of the selected first sub-region 130, the obtained output signals from sub-region pixels 114 are sufficient to enable identification of valleys and ridges in the skin of the user whose finger 120 is contacting, or in close proximity to, the contact sensing area of the sensor 100. Based on these obtained output signals for the contact portion 121 of the user's finger 120, a series of skin contours may be identified which provide biometric data suitable for identifying the user.

In regions of the sensor 100 outside the selected first sub-region 130, operation is as in step 210, where activated pixels 111 may be operable to sense contact. As in the low resolution mode, in the high resolution mode, gate drive pulses are sequentially applied to each selected row, and for gate drive pulses applied to a selected row, read-outs for each selected column are taken. These read-outs for the selected column are taken at the same time. Gate drive pulses are applied to rows sequentially one at a time. The main difference between the low resolution mode and the high resolution mode is the number of selected rows and/or selected columns. In other words, the number and thus the density of activated pixels 111 will be more in the high resolution mode. In particular, the number and thus density of activated pixels 111 will increase in the selected sub-regions.

Gate drive pulses are sequentially applied to the selected rows, as in the low resolution mode. When this operation of the rows of the pixel array gets to the first row having sub-region pixels 114, the number of selected columns from which a read-out is taken increases. A read-out is taken for each column in the selected first sub-region 130. Gate drive pulses are also applied to each row in the selected first sub-region 130, until the last row of the selected first sub-region 130 has been reached. After which time, gate drive pulses are then only applied to rows having activated pixels 111 selected by operation in the low resolution mode. Likewise, read-outs are only taken from selected columns.

If any contact is sensed in other regions of the sensor 100 than the selected first sub-region 130, the method may repeat steps 230 and 240 wherein the high resolution mode is applied and biometric data is obtained for another region of the array of pixels. The method described above may be repeated numerous times, as and when needed by its particular application. Additionally, if contact is still sensed in the selected first sub-region 130 when operation is in the high resolution mode, operation in the high resolution mode may still occur in this region for a subsequent scan. If contact is not sensed in the selected first sub-region 130 when operation is in the high resolution mode, operation in the low resolution mode may then occur in this region for a subsequent scan.

The sensor 100 and method described above provide one example of the present disclosure and how it may enable the provision of a more efficient biometric skin-contact sensor 100. In particular, this may find application for large area sensors, and specifically for such large area sensors for which a user may not contact the sensor 100 in a predictable manner. As the above-described example may apply relatively few gate drive pulses to obtain biometric data, it may also provide quicker operation. A simultaneous combination of low resolution and high resolution operation may enable continued and quick identification of contact areas for the sensor 100, for which biometric identifier may then be obtained.

The above example is however just one example of the present disclosure.

Examples of the present disclosure include a biometric skin-contact sensor 100 operable in a low resolution mode. In the low resolution mode, contact location data may be obtained which comprises an indication of a sub-region 130 of the contact sensing area in which contact is sensed. When operated in the low resolution mode, the biometric skin contact sensor 100 may require less power to operate than when the sensor 100 is operated to obtain sufficient biometric data for skin interacting with the sensor 100 to establish a biometric identity of a user whose skin is contacting the sensor 100. The low resolution mode may provide a low energy mode of operation for the sensor 100.

To control operation to be in the low resolution mode, at least one of: (i) the number of activated pixels 111, (ii) the sensitivity of activated pixels 111, and (iii) scanning frequency may be controlled. In other words, operation in the low resolution mode may comprise controlling the number of activated pixels 111 and/or the amount of energy used per activated pixel 111. Operation in the low resolution mode may comprise controlling the frequency with which pixels are activated, doing so may involve adjusting the frame rate (e.g. the time taken to do a sensor scan of activated pixels 111). Low resolution mode operation may be controlled so that energy consumption in the low resolution mode is below a selected threshold. When compared to operation in high resolution modes, at least one of these variables is reduced.

Controlling the number of activated pixels 111 may comprise controlling the distribution of activated pixels 111, such as which sub-regions of the array area include an activated pixel 111. It may comprise controlling the density of activated pixels 111 in any sub-region 130. Operation in the low resolution mode may comprise selecting only a subset of the pixels in the array of pixels to activate. The selected subset may be chosen to give a representative coverage of the array of pixels, for example to give an even coverage of e.g. the entire array. Activated pixels 111 may be spaced approximately evenly from each other and distributed across a majority of the array, for example as shown in FIGS. 1*b*, *c* and *f*.

Reducing the number of activated pixels 111 may comprise reducing the number of at least one of: (i) the selected rows, and (ii) the selected columns. For example, rows and/or columns may be skipped. That is, a gate drive pulse may not be applied to a skipped row, and/or a read-out may not be measured from a skipped column. The number of skipped rows and/or columns may be selected based on the intended use for the sensor 100 and/or intended energy consumption for the sensor 100. The intended use for the sensor 100 may influence the degree of accuracy associated with the indication of the sub-region 130 of the contact sensing area in which contact is sensed. For example, in some applications it may be preferable to pinpoint exactly where contact is sensed on the array, whereas in other applications only a rough indication may be need. The intended energy consumption for the senor may influence the number of activated pixels 111, as the more pixels are activated, the more energy will be consumed. A greater proportion of columns may be skipped (e.g. fewer read-outs performed), as this may increase energy saving when compared to reducing the number of selected rows.

Selecting the activated pixels 111 when operating in the low resolution mode may comprise selecting based on spatial patterns. That is, activated pixels 111 may be distributed in groups according to a pattern. Activated pixels 111 may have neighbouring pixels, or pixels proximate to them, which are also activated. For example, activated pixels 111 may be clustered together, with the clusters of activated pixels 111 distributed about the array of pixels. Adjacent rows and/or columns may have activated pixels 111. Embodiments may enable more reliable contact detection, as sensed measurements may be normalized based on proximal activated pixels 111.

Spatial patterns may include rectangles (e.g. squares) in which there are a plurality of subsequent rows and/or columns with activated pixels 111. This may include one row of activated pixels 111 with a read-out from a number of different columns in that row. For example, every column in a row may be read-out, or a number of columns which are either neighbouring or proximal to one another may have read-outs taken. Using one or only a few rows may facilitate easier operation and/or greater sensitivity. Other exemplary patterns include multiple subsequent rows. Other geometric patterns may be used. These may be determined based on a known application for the sensor.

In some examples, multiple rows may be addressed at the same time, with column read-outs also being taken simultaneously. This may reduce the precision of any one read-out, as a sensed voltage indicative of capacitance of a proximal body may be present for a number of rows in that column. However, the read-out may still provide a useful output. For example, such a read-out may enable an indication of the type of element in contact with the sensor to be determined. For example, a touch pen may have a much finer tip than the finger of a user which is touching the sensor. A user's finger may have a larger read-out as more activated pixels 111 may register contact. Where simultaneous read-outs are taken, a precision may be reduced for exactly where contact is being registered within the rows having a read-out taken. However, this may reduce power consumption. More precise scans could be used to identify more precisely where within the activated pixels in a simultaneous column read-out the contact was occurring.

Simultaneous read-outs from a number of rows may be used in combination with a cluster of activated pixels 111. For each cluster, read-outs may be taken simultaneously. This may still enable contact to be identified in the low resolution mode. As the read-out for any column in a cluster may include signals from multiple different pixels (e.g. multiple different rows), this signal may indicate a number of activated pixels 111 which are registering an indication of contact. In the low resolution mode, it may be determined that the array of pixels is being contacted in a sub-region based on a read-out from a number of different activated pixels 111 in that sub-region. Some of these activated pixels 111 may have had a simultaneous read-out. The use of simultaneous scanning and/or simultaneous read-outs may find use when determining whether a point of contact on the array surface is moving. For example, simultaneous addressing of multiple rows may be utilized to determine a moving body, to reduce the likelihood of a moving body registering contact in multiple pixels depending on what time pixels are addressed and read-out.

The location of the activated pixels 111 may be selected based on an application or type of the sensor 100. For example, previous sensor data may be used to select likely regions for a user to interact with on the array of pixels. These locations may be learned, so that over time the selection and location of activated pixels 111 in the low resolution mode can evolve to be more adapted to typical interactions with a user. The location of activated pixels 111 may be selected on the assumption that initial contact occurs in a central region of the sensor. That is, the majority of the activated pixels 111 may be located in a central region of the array. Operation of the sensor in the low resolution mode may comprise inhibiting activation of pixels in a perimeter region of the sensor. For example, no pixels may be activated within this perimeter region, such as a region around the perimeter a selected number of pixels wide. In some examples, distribution of activated pixels 111 may be based on the centre of the pixel array. That is, as you move outwards from the centre, activated pixel density 111 decreases.

In the low resolution mode, scans may be repeated until contact is detected. Repeating scans may comprise performing a first scan, then waiting for a selected amount of time, before performing a second scan. The amount of time between subsequent scans may also be controlled based on the intended use for the sensor 100 and/or intended energy consumption for the sensor 100. For sequential scans the selected rows/columns may change, or they may remain the same.

As to controlling the sensitivity of an activated pixel 111, this may comprise controlling the amount of energy used by that activated pixel 111. This may comprise selecting the amount of energy applied in each gate drive pulse. For example, a pulse time of each gate drive pulse (e.g. an 'on time') may be controlled and/or a current/voltage for the gate drive pulse may be controlled. For example, the amount of energy required to take a read-out from each column of the array may be controlled, such as by selecting at least one of a time, current and/or voltage associated with the read-out. To control the resolution mode the time in between successive scans (e.g. scanning frequency) may be selected.

Controlling the sensitivity of an activated pixel 111 may influence a signal to noise ratio of measurements provided by that pixel 111. Increasing the signal to noise ratio of any given pixel 111 may increase the reliability and/or precision provided by that pixel 111. Operation of an activated pixel 111 may be controlled to increase the signal to noise ratio when in the high-resolution mode for that pixel 111. That is, the amount of time and/or energy applied to obtain a measurement from that pixel 111 may be increased. It is to be appreciated that a linear correlation may not exist in terms of input energy to a pixel 111 and output signal to noise ratio, such that a maximum sensitivity for a pixel 111 may be achieved below an infinite amount of applied energy.

Controlling operation of the sensor 100 in the different resolution modes as described herein may facilitate the provision of a continuous value for energy consumption (e.g. per scan). That is, a number of different possible high and low resolution modes may be selected. The attributes of the low/high resolution mode selected may be controlled based on application of the sensor 100. Energy consumption values for different resolution modes may be continuously spread out or pre-defined discrete energy levels may be defined for such resolution modes.

In the low resolution mode, the resolution may provide an indication of the reliability and/or precision of output signals indicating stored charge. For example, in lower resolution modes (e.g. at lower energy consumption), the signal to noise ratio of measurements may increase. At a higher energy resolution mode, (e.g. higher energy consumption), the reliability and/or precision of measurements may increase. A resolution spectrum may therefore be defined. That is, low resolution may be a relative term. Multiple 'low resolution' modes may therefore be defined in which different resolutions are used. For example, the sensor 100 may be configured to operate in a first low resolution mode in which energy consumption is at a first low level. An indication of contact may be obtained, and it may be determined that operation in a second low resolution mode should be performed. In the second low resolution mode, energy is at a second low level, which is higher than the first low level. In the second low resolution mode, the sensor 100 may obtain a clearer (e.g. more reliable) indication of contact. In which case, the sensor 100 may then be operated in the high resolution mode to obtain biometric data.

Further low resolution modes may be defined. For example, a third low resolution mode may be defined in which energy is at a third low level, which is lower than the first low level. This may for example, be an 'idle mode'. The idle mode may be used when no contact has been sensed for a threshold amount of time. For example, this may be an indication that no further contact is likely to occur in the near future, and so the sensor 100 can further conserve energy by using the idle mode. It is therefore to be appreciated that numerous low resolution modes may be defined and/or for any given low resolution mode, its properties may be controlled based on a particular application for the sensor 100.

In the low resolution mode, the sensor 100 is operable to obtain contact location data comprising an indication of a sub-region 130 of the contact sensing area in which contact is sensed. The obtained contact location data may be processed to determine the sub-region 130 of the contact sensing area. The obtained contact location data may be based on the obtained output signals from pixels which provide indications of stored charge for the activated pixels 111 in the array. Each activated pixel 111 may provide an indication of a stored charge on the on the capacitive sensing electrode of that pixel 111. For each activated pixel 111, determining whether or not that pixel 111 has been contacted may be based on the output for that pixel 111 and optionally also on output signals for other pixels, such as neighbouring pixels. For example, if the pixel 111 has an indication of a stored charge on the capacitive sensing electrode above a threshold level, contact may be determined to have occurred. If the pixel 111 has an indication of a stored charge below that threshold level, but above a lower threshold level, it may be determined that contact may have occurred. Output signals from other pixels 111 (e.g. neighbouring pixels) may then be used to determine the likelihood of that output signal being indicative of contact. For example, if all, or at least some, of the neighbouring pixels indicated contact, then it may be determined that contact with that pixel 111 occurred. One option may be to average read-outs from multiple pixels individual values compared to individual read-out values. Other signal processing methods may also optionally be used in combination or alternatively to determine the likelihood of output signals from activated pixels 111 correctly indicating contact or not.

The extent to which probabilistic sensing of contact occurs may also be dependent on an energy associated with the low resolution mode. For example, when a higher energy low resolution mode is used, sensed contact may be considered to be more likely to be correct than if a lower energy low resolution mode were to be used.

The sensor 100 is operable in a high resolution mode to obtain biometric data for skin interacting with the contact sensing area by identifying differences in obtained indications of stored charge associated with valleys and ridges of the skin in contact with the sensor 100. The sensor 100 may obtain an output signal from a number of activated pixels 111 which enables an indication of contours for valleys/ridges of the skin contacting the sensor 100 to be obtained. This obtained contour map may provide biometric identifier data, as the user may be distinguished, and therefore identified, based on their skin contours.

Operation in a high resolution mode may consume more energy than operation in a low resolution mode. As with the low resolution mode, the amount of energy consumed may be variable depending on a number of factors, and these factors may be controlled to achieve desired performance characteristics. For example, at least one of: (i) the number of activated pixels 111, (ii) the amount of energy used per activated pixel 111, (iii) frame rate, and (iv) an amount of simultaneous line scanning (as opposed to scanning individual lines) may be selected based on application of the sensor 100. A plurality of different 'high resolution modes' may therefore be defined.

In the high resolution mode, more pixels 111 may be activated than in the low resolution mode. The density of activated pixels 111 may be higher than in the low resolution mode. For example, in some sub-regions (such as the selected first sub-region 130) the density of activated pixels 111 will be higher than in other sub-regions, e.g. the majority, or even all, of the pixels in that sub-region 130 will be activated. All of the pixels in a selected sub-region 130 may be activated. Some of these pixels in the selected sub-region 130 may be activated without necessarily activating all of them. For example, more pixels in a selected sub-region 130 may be activated in the high resolution mode than in the low resolution. The density of activated pixels 111 may be controlled based on the size of a selected area, e.g. the density may decrease for larger areas so that the total number of activated pixels 111 in that region does not increase so much with increased area.

In the high resolution mode, the sensitivity (e.g. the amount of energy used) per activated pixel 111 may be different to that in the low resolution mode. For example, the same number of pixels may be activated in the high resolution mode as in the low resolution mode, with a different sensitivity per activated pixel 111, so that the high resolution mode provides increased functionality (or at least more reliable functionality) than the low resolution mode. As with the low resolution mode, the amount of time a gate drive pulse is applied for, or currents/voltages associated with the array of pixels may be increased to improve measurement accuracy/reliability. A refresh rate for the array of pixels may be varied when in the high resolution mode.

The sensor 100 may be configured to select a first sub-region 130 based on obtained contact location data for contact with the sensor 100. Each activated pixel 111 may provide an output signal. Based the indication from each pixel 111, it may be determined whether or not a user has contacted that pixel 111. For example, as described above, if the output signal indicates a stored charge above a threshold level, it may be determined that there is contact with that pixel 111. In practice, the pixels are small relative to the size of a user interacting with the sensor 100. Contact between a user and the sensor 100 will typically cause a plurality of activated pixels 111 to provide an output signal indicative of contact. Based on an indication of sensed contact from at least one activated pixel 111, a sub-region 130 of the array is determined for which it is likely that there will be sufficient contact for obtaining biometric data from skin interacting with the sensor 100 in that region. It is to be appreciated that this sensing stored charge and determining a selected sub-region 130 could be performed when in either resolution mode.

Selecting a sub-region 130 may be determined based on the obtained indications of sensed contact for activated pixels 111 (e.g. both indications of contact and of no contact). At least one sub-region 130 may be selected to encompass at least some of these activated pixels 111, e.g. to encompass the majority, or even all, of these activated pixels 111. Multiple separate sub-regions may be defined to encompass these activated pixels 111. Operation in the high resolution mode may comprise operating in the selected sub-region(s) at the high resolution, and optionally operating in the low resolution mode, or not at all, in sub-regions outside the selected sub-region(s) 130. It will be appreciated that the energy consumption may be dependent on the size of (e.g. the number of pixels in) the selected sub-region(s).

In the example above, the selected sub-region 130 was the smallest rectangle (with axes of rows and columns of the array) which encompasses all activated pixels 111 registering contact. However, this need not be the case. Other shapes may be used to encompass the activated pixels 111 registering contact. Activated pixels 111 registering contact may cluster, and there may be multiple clusters of activated pixels 111 across the array. Each cluster may have: edge pixels registering contact around the edge of the cluster (e.g. so that activated pixels located outwards from the edge pixels do not register contact), and core pixels registering contact in the middle of the cluster (e.g. where activated pixels 111 located outwards from the core pixels register contact). A selected region may be determined based on a shape defined by the edge pixels. For clusters which are 'hollow' e.g. like an annulus, there may be two sets of edge pixels—on the outside and on the inside. In which case, two sets of edge pixels may be defined, and a selected region may be determined based on two shapes: one defined by the first set of edge pixels, and one defined by the second set of edge pixels.

Multiple sub-regions may be selected. These may be identified by there being activated pixels 111 which register no contact between activated pixels 111 which register contact. If there are only a few activated pixels 111, these may be disregarded as outliers, and one selected sub-region 130 may be defined. However, if there are a substantial number, then two separate sub-regions may be defined.

The size and/or shape of the selected sub-region 130 may be determined based on a magnitude of the stored charge registered by the activated pixels 111. For example, within a sub-region in which all activated pixels 111 sense contact, the sensed indications of stored charge may still vary in magnitude. This may be taken into account. For example, a shape for the selected sub-region 130 (e.g. that sub-region 130) may be defined based on the activated pixels 111 with the highest indicated values for stored charge, or the selected sub-region 130 may be an area with a shape scaled up in size/area, so as to define a selected sub-region 130 which encompasses other activated pixels 111 in the sub-region 130 as well. The shape of sub-regions in which output signals are indicative of contact may be considered when selecting the selected sub-region(s) in which high resolution scanning is to be performed.

In some examples, when determining whether or not the charge stored on the capacitive sensing electrode of the pixel is indicative of contact, the change in charge may be considered. For example, if a change in the charge stored on the capacitive sensing electrode of a pixel is above a threshold level, this may be used when determining contact. For example, it may be determined that a pixel has been contacted if its sensed charge has increase by a selected amount. This may help with calibration issues, as a change in an output signal may provide an indication that the signal itself has changed (as opposed to the noise having changed). This may also help in regions where a user is close to the sensor and then moves so that they are now in contact with that sensor.

Another factor which may be considered when selecting a sub-region 130 of the sensor array for the high-resolution mode is movement of the contact area on the array. For example, a user's finger 120 may move slightly, or less slightly (if movement is intentional) when placed on a sensor 100. The size, shape and/or location of a selected sub-region 130 may be selected based on this tracked movement. For example, the size and/or shape may be elongated in the direction of movement. The location may be changed to compensate for this movement, e.g. there may be a predictive element as to where the contact location will be located when the next scan is performed. Sensing, and determining, of movement is described in more detail below.

Depending on the application and/or location of the sensor 100, there may be known body parts which interact with the sensor 100. The sensor 100, or a computer connected to the sensor 100, may store data for body parts known to interact with the sensor 100. Based on known body part data, the sensor 100 may be trained to identify that, based on the contact regions identified, a known body part is likely to be present. Data regarding this known body part, e.g. particular regions of interest may then be used when selecting the sub-region 130. For example, known sub-regions of this body part may be known to provide more reliable, or more useful, biometric data. The selected sub-region 130 may be selected to focus on these parts. Known body parts may be identified using image recognition software, such as that provided by trained convolutional neural networks, or other suitable machine learning structure.

Another factor which may be considered when selecting a sub-region 130 of the sensor array for the high-resolution mode is the pressure being applied to the sensor 100 by the user's skin interacting with it. An indication of pressure may be determined based on a magnitude of the stored charge. However, other ways of measuring pressure could also be used.

Pressure may be determined by looking at a change in contact areas for sequential scans. For example, after a first scan it may be determined that a contact area is in contact with the sensor area. This contact area may have a first cross-sectional area for a sub-region 130 in contact with the sensor 100. A subsequent second scan may be performed from which it is determined that said contact area now has a second cross-sectional area. By comparing the two cross-sectional areas, an indication of pressure being applied may be obtained. For example, if the second cross-sectional area has increased, this is an indication that the pressure may have increased. This therefore provides an indication of a relative pressure. Such an indication of pressure may be used when determining selecting the sub-region 130. For example, areas in which pressure is highest may be the most important areas, e.g. the user may be pushing harder with those areas, such as to emphasise them.

The selected sub-region 130 may also be selected to encompass a border region 132. The border region 132 may extend the sub-region 130 by a selected amount. A contact region defined by the activated pixels 111 which registered contact may therefore be extended by the border region 132. The size and/or shape of the border region 132 may be determined based on similar components as for the size and/or shape of the selected region itself. That is, any of: the shape of the contact region, the movement of the contact region, the pressure distribution within the contact region, known important body parts associated with the contact region may be taken into account when selecting the border region 132. The border region 132 may encompass additional non-activated pixels 112, e.g. which if activated may have registered contact. These additional pixels encompassed by the border region 132 may be limited to only those between activated pixels 111 registering contact and the nearest activated pixels 111 not registering contact. The border region 132 may extend further, e.g. to include activated pixels 111 which did not register contact.

As an example of selecting sub-regions, if the sensor 100 were a hand print sensor where a user places their entire hand on the sensor, sub-regions may be selected as follows.

An outline for the hand may be obtained, as the bottom surface of the hand may be in contact with the array of pixels, or at least sufficiently close to the array, so that output signals from pixels 111 lying underneath the hand register a stored charge above a threshold level. For example, this may be identified when in the low-resolution mode. These output signals may therefore indicate a hand-shaped distribution of activated pixels 111 which have registered a stored charge above the threshold level.

The hand sensor being used is arranged to obtain biometric data and to determine from this biometric data the identity of the user whose hand is on the sensor. When the hand is placed on the sensor, certain regions of the hand may be in firmer contact with the sensor than others. For example, the base of the hand and the fingertips may be in closer contact with the sensor than other parts of the hand. The contact shape between the finger tips and the sensor may be roughly oval-shaped, and more pressure may be applied by the fingertips than the base. It may also be known that certain parts of the hand, such as the finger tips (as opposed to the base) provide better skin contour data for identifying the user based on this skin contour data.

When determining the selected sub-region 130, these factors could all be taken into account. Firstly, it may be determined that there are several separate regions touching the sensor (or which are close enough to provide an indication of contact). These may be each finger and the base. It may therefore be determined that six selected sub-regions could be used. Secondly, the shape of each sub-region/contact area is taken into account. Each of the fingertips may provide an oval-shaped contact region. Thirdly, a pressure distribution may indicate that the most pressure is being applied by the fingertips. Fourthly, no movement may be detected by the sensor. Finally, the sensor may be arranged to detect hands, and may contain previous data indicating that the fingertips provide the best biometric data for regions of a hand. When selecting the sub-region 130, some or all of this may be taken into account. As in this example, the fingertips appear to be the most useful region for obtaining useful biometric data. These areas may be prioritised then, such as by confining most of the energy applied in scanning to that region. This may enable faster scanning/higher resolution to that region. This may be by applying more energy to pixels 111 in those regions, or by having a greater pixel density in those regions. An oval-shaped region may be defined which encompasses the activated pixels 111 in the fingertip regions which registered a stored charge indicative of contact, which region may be centered on the highest pressure areas. A border region 132 may also be defined around this oval-shaped region. This border region 132 may also be oval-shaped.

By determining the selected sub-regions in this manner, in the example of the hand sensor, higher energy scanning (e.g. in the high-resolution mode) may be confined primarily to the fingertips. This is where this scanning could provide the quickest and/or most efficient convergence towards obtaining suitable biometric data to enable identification of the user whose finger is in contact with the sensor. Embodiments may therefore enable the provision of a quicker and/or more efficient biometric sensor which finds particular application for larger scale biometric sensors.

In the specific example described above with reference to FIGS. 1 and 2, when operating in the high-resolution mode, pixels 111 are activated by applying a gate drive pulse sequentially to rows in the array. The sensor 100 may therefore simultaneously (e.g. per one scan—on a row-by-row basis) provide operation in a high-resolution mode for the selected sub-region 130 whilst also providing operation in a low-resolution mode for the other sub-regions outside the selected sub-region 130.

Operation for activated pixels 111 in the high-resolution mode, such as those in the selected sub-region 130, may be spatially and/or temporally interleaved with operation for activated pixels 111 in the low-resolution mode, such as those outside the selected sub-region 130. Spatial and temporal interleaving will now be described with reference to FIGS. 3 and 4.

FIGS. 3a to 3e show an example of spatial interleaving. Spatially interleaving comprises apply gate drive pulses to each selected row in order. When pulses are applied to a row, read-outs for selected columns may be taken in order or they may be taken at the same time. That is, for each pulse applied to a row, a read-out is taken from the selected columns. Of course, it is to be appreciated that column read-outs may be taken one at a time, or the multiple read-outs may be taken with the signals multiplexed to identify the read-out from each column This is repeated for each selected row until data has been obtained from all activated pixels 111. Spatially interleaving comprises increasing the number of selected columns and/or rows when in the selected sub-region 130 of the array. Pixels 111 are activated based on their position in the array (e.g. independently of their mode of operation). For a complete scan, each activated pixel 111 will be activated once. Activated pixels 111 will be activated based on their position in the array, e.g. not based on which mode of operation they are being operated in.

Figure 3A:
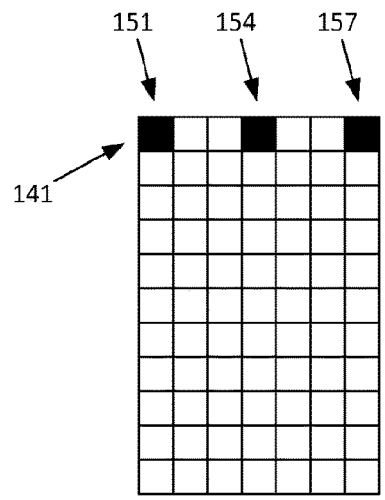
FIGS. 3a to 3f show schematic diagrams of an example of spatially interleaving activated pixels in a high resolution mode with activated pixels in a low resolution mode.
Figure 3B:
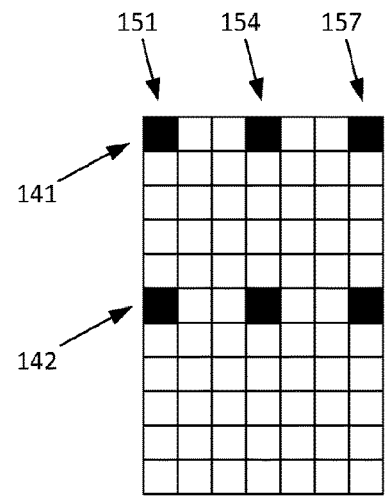

This is shown in FIGS. 3a to 3e. In FIG. 3a, gate drive pulses are first applied to a first row 141. A pulse is applied to the first row 141, where read-outs are taken from a first column 151, a fourth column 154 and a seventh column 157 in turn. That is, the whole row 141 is addressed (e.g. applied to all gates), but a read-out is only taken from three columns (to provide a read-out from 3 pixels). In FIG. 3b the next activated row is activated, which is second row 142. Both the first and second row fall outside the selected sub-region 130, and so their activated pixels 111 are selected based on spatial constraints for the low resolution mode (e.g. every 5 columns and every 3 rows). Again, for the second row 142, read-outs are taken for the first, fourth and seventh columns 151, 154, 157.

Figure 3C:
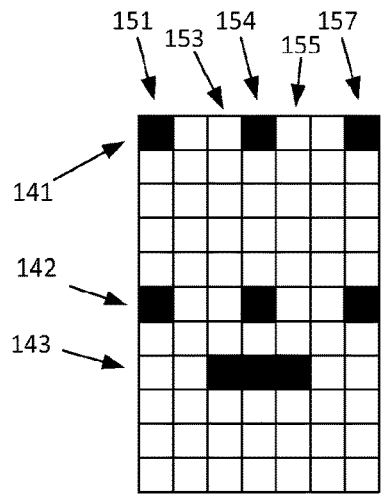
Figure 3D:
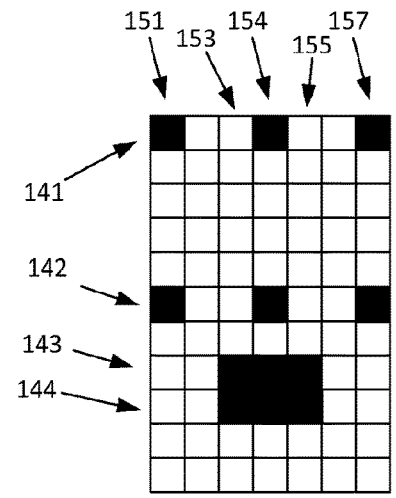
Figure 3E:
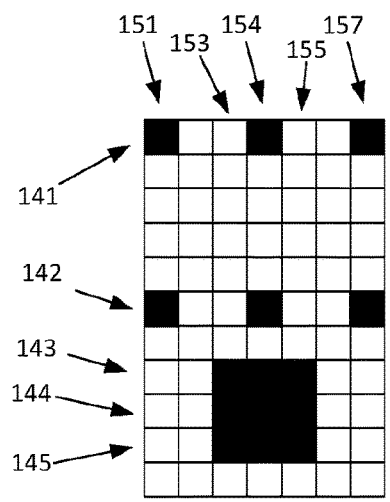
Figure 3F:
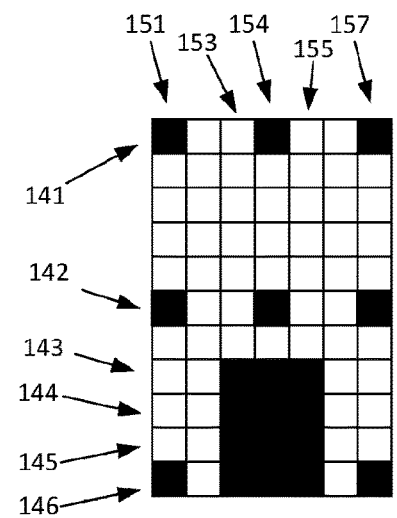

In the present case, the selected sub-region 130 encompasses a rectangle spanning the bottom four columns and the middle three rows. In FIGS. 3c to 3e, gate drive pulses are sequentially applied to third, fourth and fifth rows 143, 144, 145. For each of these rows, read-outs are taken from third, fourth and fifth columns 153, 154, 155. A gate drive pulse is applied and the read-outs from the relevant columns are taken before the third low resolution mode row (sixth row 146) has a pulse applied thereto. This is then shown in FIG. 3f, where the distribution of activated pixels 111 in the array can be seen. Activated pixels 111 are activated in turn based on their position in the array. That some of these pixels 111 are activated in a high resolution mode in a selected sub-region 130 and others are not does not affect the order in which they are activated. The order is based on their location in the array.

FIGS. 4a to 4d show an example of temporal interleaving. Temporally interleaving may comprise performing more than one scan to obtain data from each activated pixel 111. Low resolution mode pixels are activated in a different scan to high resolution mode pixels. Either order may be taken for doing this. For example, all high resolution mode pixels may be activated. Then, once data has been obtained from each of these pixels, all low resolution mode pixels may be activated and data obtained therefrom.

Figure 4A:
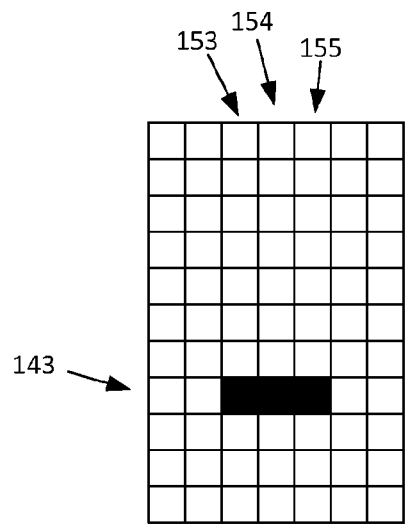
FIGS. 4a to 4d show schematic diagrams of an example of temporally interleaving activated pixels in a high resolution mode with activated pixels in a low resolution mode.
Figure 4B:
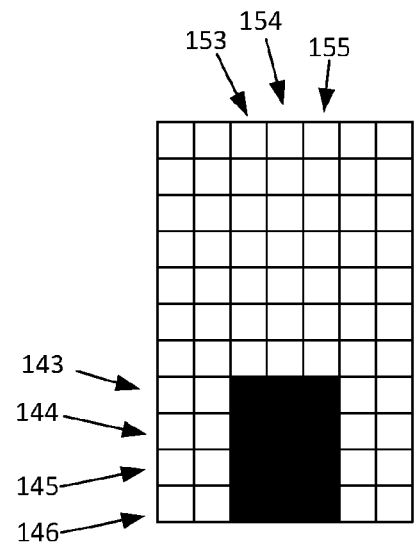

FIGS. 4a and 4b show the first scan being performed. This is in a high resolution mode, and the pixel density is higher. In FIG. 4a, the third row 143 is activated first by applying at least one gate drive signal thereto, and recording the read-out from third, fourth and fifth columns 153, 154, 155.

FIG. 4b shows the array after all of the activated pixels 111 in the selected sub-region 130 have been activated. One scan has been performed, and it has activated all pixels 111 in the selected sub-region 130 (although high resolution mode operation may not necessarily require all pixels in the selected sub-region 130 to be activated).

Figure 4C:
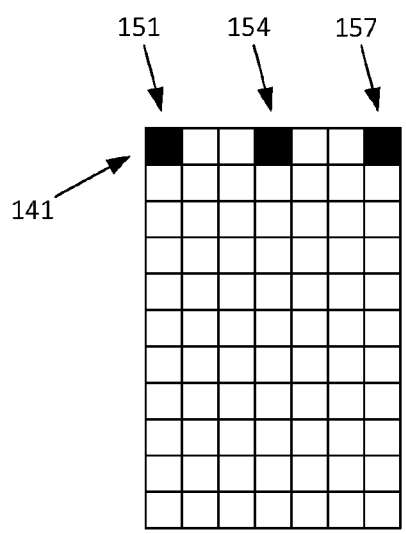
Figure 4D:
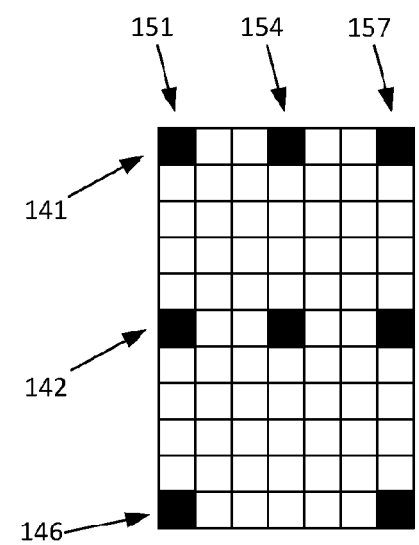

FIGS. 4c and 4d show a subsequent scan being performed. This scan shows low resolution mode operation. In FIG. 4c, the first row 141 is activated, and read-outs are taken from the first, fourth and seventh columns 151, 154, 157. Then, in FIG. 4d, the remaining activated pixels 111 for the low resolution mode are activated. The bottom centre pixel (in row 146 and column 154) is not shown as being activated, but this is not to be considered as limiting. It may be activated in one or both resolution modes. As can be seen, temporal interleaving comprises obtaining scan data from one resolution mode before obtaining it from the other.

For both temporal and spatial interleaving, each activated pixel 111 in a scan may have the same gate drive pulse applied thereto, or different gate drive pulses may be applied thereto. For example, in the high resolution mode, higher energy gate drive pulses may be applied which provide increased sensitivity per activated pixel 111. The gate drive pulse to be applied may differ between different scans and/or between different pixels (e.g. to control operation based on which high/low resolution mode that activated pixel 111 is in). The gate drive pulse may differ between different rows, and/or the gate drive pulse for one row may be varied depending on which column a read-out is to be taken from.

The sensor 100 may be operable to detect movement of a contact region of a user's skin which is in contact with the sensor 100. Movement may be sensed between subsequent scans by determining whether a contact region in the subsequent scans corresponds to a contact region in the previous scans, and is displaced from it on the array. Determining whether two contact regions correspond may be based on any one of their size, their shape, their location, biometric data obtained therefrom, their pressure being applied and/or how many contact regions there are on the sensor array. If it is determined that two contact regions in subsequent scans correspond to one another, then their displacement is measured. Based on a rate of change of displacement, their velocity may also be determined.

Operation of the sensor 100 may be controlled based on whether movement has been detected or is expected. The sensor 100 may be operated in such a way that it is more likely to detect movement, and/or to measure the movement accurately. Detecting movement may also be dependent on the particular application for which the sensor 100 is being used, as for some sensors, detecting the dynamics of the movement itself may be a priority, whereas for other sensors, obtaining biometric data may be a priority. It is to be appreciated that operation of the array may be controlled to prioritise such obtaining of relevant data.

Both the low-resolution and high-resolution modes may be used to sense movement. In the high-resolution mode, obtained biometric data may enable more accurate/reliable detection that contact zones in subsequent scans correspond to one another. In the low-resolution mode, higher refresh rates (e.g. lower overall times per scan) may be achieved, which enables the difference in location of contact regions between subsequent scans to be reduced. This may enable more scans to be performed per unit time, and so particular trajectories across the sensor array may be identified to greater detail. Selection of selected sub-regions may also be changed to monitor movement better, such as to confine high-resolution mode operation to pixels 111 into which it is expected that the contact region will have moved. A combination of high and low resolution modes may be used for tracking movement.

The biometric sensor 100 may find a number of particular applications, and its operation may differ depending on its application. The biometric sensor 100 is operable to provide mode-switching. Mode-switching may depend on the specific application for the sensor 100. The sensor 100 may be connected to a computer, e.g. so that the sensor 100 provides an input to the computer, and its application may be controlled based on the computer. Interaction between the computer and the sensor 100 may determine the mode-switching used by the controller, for example so as to provide a desired functionality for the sensor 100. In the example described above, the sensor 100 is configured to switch from a low resolution mode to a high resolution mode in the event that contact is sensed in the low resolution mode, and the high resolution mode is for a contact region determined based on this contact sensed in the low resolution mode. However, that specific example of an application for the sensor 100 is not to be considered limiting, and other examples for applications of the present disclosure will now be described.

The sensor 100 may be configured to switch from a high-resolution mode to a low-resolution mode. This may occur in the event that it is determined that there is an absence of contact being when in the high-resolution mode. In this case, contact may be sensed based on activated pixels 111 which are being operated in the low-resolution mode (e.g. those outside the selected sub-region 130) and/or activated pixels 111 which are being operated in the high-resolution mode (e.g. those inside the selected sub-region 130). This may involve changing the location of the selected sub-region 130 between subsequent scans, before returning to operation in the low-resolution mode for all pixels in the array (e.g. with no selected sub-region 130 defined). The sensor 100 may be operable to be repeatedly (e.g. continually) switched between these two different modes. This switching may be based on contact being sensed with the array, or a lack of contact being sensed.

Switching of modes may be controlled based on an application of use for the sensor 100. For example, the sensor 100 may be connected to a computer (e.g. any device with a processor), and the computer may provide input to the sensor 100 to control its mode of operation. This input may be based on the application-specific requirements for the sensor 100. Biometric data provided by the sensor 100 (when in the high-resolution mode) may be used for security reasons, e.g. to provide access to secure material. Once the sensor 100 has been used to provide secure verification, biometric data may not be needed. The computer may control the sensor 100 to operate first in a high-resolution mode so that biometric data may be obtained. Once sufficient biometric data has been obtained for providing the relevant security verification for the user touching the sensor 100, the sensor 100 may be controlled to operate in a different resolution mode. For example, the sensor 100 may then be made to operate in the low resolution mode, and/or it may be made to operate in a lower resolution mode. Operation in such a lower (or the low) resolution mode may enable reduction in energy requirements for the sensor 100 whilst still providing the required functionality for the application.

The sensor 100 may operate at further resolutions. For example, a higher resolution mode may be used which provides higher resolution data than the high resolution mode. The higher resolution mode may be provided by operating more pixels 111 in a region, or applying more energy to each pixel 111 in a region. This may find application where operation in the high resolution mode has not provided the desired obtained biometric data, or where higher resolution data is required. The computer may control the sensor 100 to further operate in the higher resolution mode. The sensor 100 may itself be configured to determine that obtained biometric data is insufficient for purpose and control the array of pixels to operate at a higher resolution than when in the high resolution mode.

The sensor 100 of the present disclosure may therefore be operated in a number of different modes, and these modes may be selected depending on application specific requirements for that sensor 100. For example, the sensor 100 may be controlled to operate in a low resolution mode, where sensing an indication of a contact region in the array is required. The sensor 100 may be controlled to operate in a number of different 'low' resolution modes (e.g. higher or lower resolution than the low resolution mode), in which an indication of a contact region in the array may be provided. Which of these different modes is used may be selected based on different requirements for operation, such as the time taken to obtain a measurement, the accuracy/reliability of the measurement and/or energy consumption requirements for the sensor 100. For example, the sensor 100 may be controlled to operate in a high resolution mode where obtaining biometric data is required. The sensor 100 may be controlled to operate to operate in a number of different 'high' resolution modes (e.g. higher or lower than the high resolution mode). Which of these modes is used may be selected based on different requirements for operation (e.g. such as those mentioned above for low resolution modes).

It is to be appreciated that the drawings discussed herein are conceptual rather than to scale diagrams. For example, FIGS. 1a to 1f indicate operation of such a sensor. For examples described herein, sensors may have more than 300 pixels per inch. 500 pixels per inch may be used. It is to be appreciated that between 300 and 500 pixels per inch may be used. The exact number is not to be considered specific. Instead, the number of pixels per inch should enable the sensors to resolve contours on a user's finger to obtain biometric data.

It is to be appreciated in the context of the present disclosure that the systems and methods for controlling operation of the sensors described herein may be performed by any suitable processor. For example, a controller may be provided for performing these functions. The controller may be provided with the sensor 100, e.g. internal to the sensor 100, or it may be provided by some other component, e.g. external to the sensor 100. The controller may comprise a processor included as part of the sensor 100, and which carries relevant computer program instructions to perform methods described herein. The controller may comprise a processor included as part of a computer (e.g. external to the sensor 100) to which the controller is connected. Application specific control of the sensor 100 may be provided by the computer to which the sensor 100 is connected and/or it may be provided by the sensor 100 itself. The computer may send a control signal to the sensor 100 based on the desired operation of the sensor 100, and the sensor 100 may control operation of the array of pixels accordingly. It is to be appreciated in the context of this disclosure that a computer as described herein may comprise any component having a processor which performs functions which may use sensors described herein. For example, the computer may comprise a personal computer, a laptop, a mobile telecommunications apparatus, a tablet, any apparatus (e.g. including an ASIC or processor circuit) for which biometric data may be used to provide secure verification. For example, smart door handles, selling machines, guns etc. may be provided wherein a handle with which a user interacts comprises a sensor to control operation of that device based on the biometric data of the person holding that handle.

Examples of pixels and pixel arrays of the present disclosure will now be discussed with reference to FIGS. 5 to 9. These pixels/pixel arrays may form a sensor array of the biometric skin-contact sensor 100 of the type disclosed herein.

Figure 5:
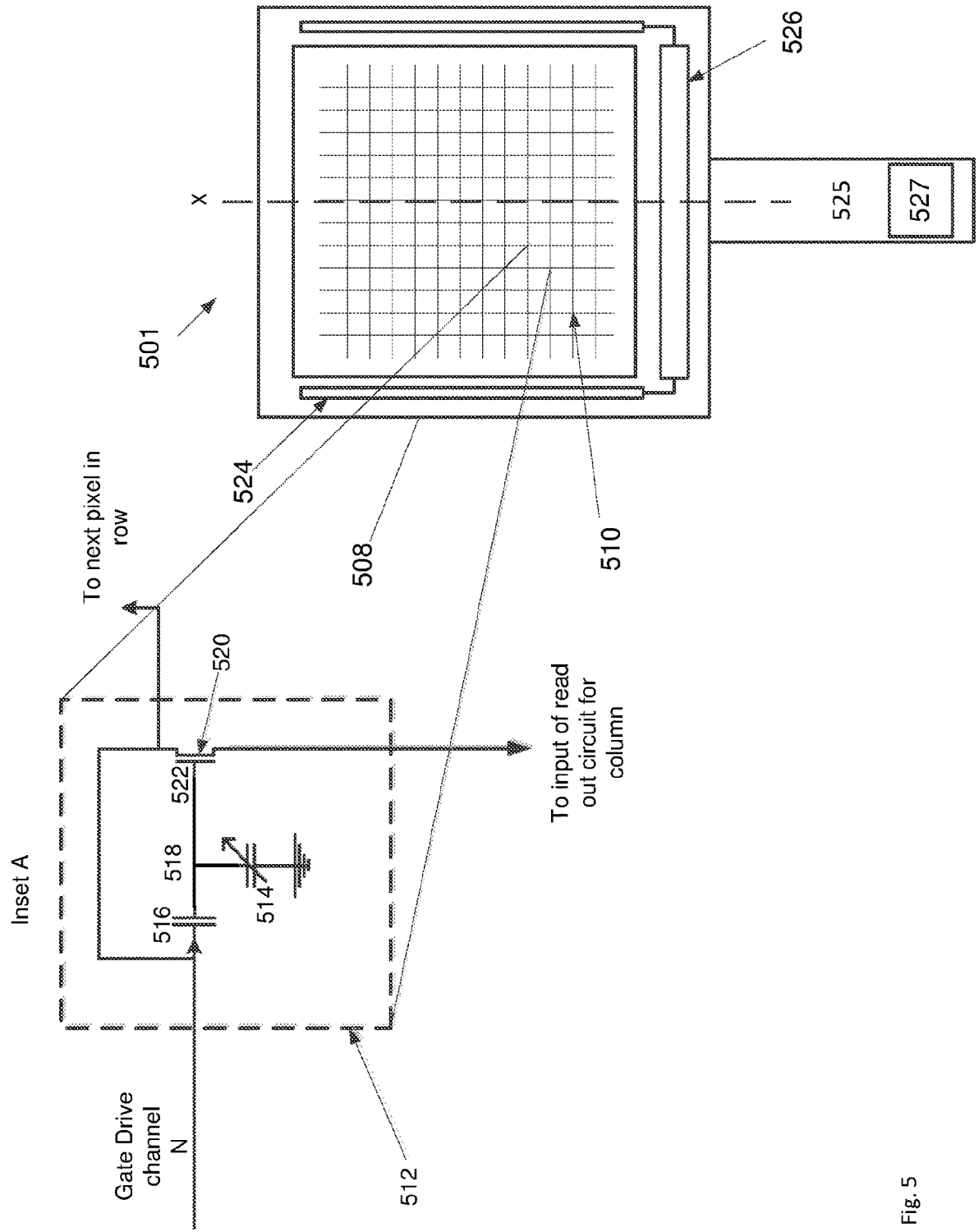
FIG. 5 is a schematic diagram of a plan view of a sensor apparatus comprising a sensor array, and Inset A of FIG. 3 shows a circuit diagram for a pixel of the sensor array.
Figure 6:
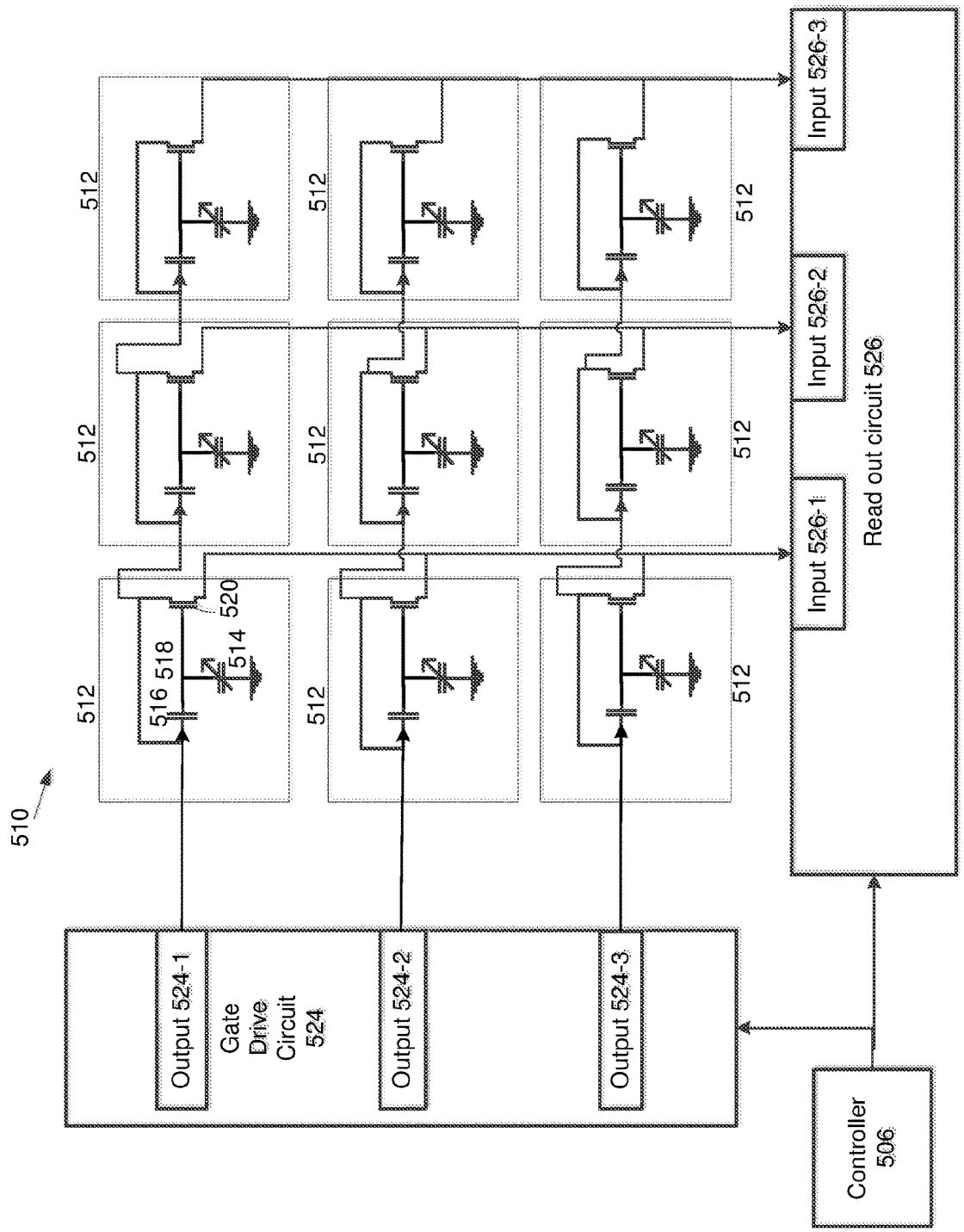
FIG. 6 shows a circuit diagram of a sensor array for a sensor apparatus such as that illustrated in FIG. 5.

FIG. 5 shows a sensor apparatus 501 in which a sensor array 510 may be incorporated. FIG. 6 illustrates a circuit diagram of one such sensor array 510. The description which follows shall refer to FIGS. 5 and 6 together. It can be seen from an inspection of FIGS. 5 and 6 that inset A of FIG. 5 shows a detailed view of one pixel of this array 510.

The sensor array 510 comprises a plurality of touch sensitive pixels 512. Typically, other than in respect of its position in the array, each pixel 512 is identical to the others in the array 510. As illustrated, each pixel 512 comprises a capacitive sensing electrode 514 for accumulating a charge in response to proximity of the surface of a conductive object to be sensed. For example, this may include the operator contacting the sensor apparatus 501. A reference capacitor 516 is connected between the capacitive sensing electrode 514 and a connection to a gate drive channel 510-1 of a gate drive circuit 510. Thus, a first plate of the reference capacitor 516 is connected to the gate drive channel 510-1, and a second plate of the reference capacitor 516 is connected to the capacitive sensing electrode 514.

Each pixel 512 may also comprise a sense VCI (voltage controlled impedance) 520 having a conduction path, and a control terminal (522; inset A, FIG. 5) for controlling the impedance of the conduction path. The conduction path of the sense VCI 520 may connect the gate drive channel 510-1 to an output of the pixel 512. The control terminal 522 of the VCI is connected to the capacitive sensing electrode 514 and to the second plate of the reference capacitor 516. Thus, in response to a control voltage applied by the gate drive channel 510-1, the reference capacitor 516 and the capacitive sensing electrode 514 act as a capacitive potential divider.

The capacitance of the capacitive sensing electrode 514 depends on the proximity, to the capacitive sensing electrode 514, of a conductive surface of an object to be sensed. Thus, when a control voltage is applied to the first plate of the reference capacitor 516, the relative division of that voltage between that sensing electrode 514 and the reference capacitor 516 provides an indication of the proximity of the surface of that conductive object to the capacitive sensing electrode 514. This division of the control voltage provides an indicator voltage at the connection 518 between the reference capacitor 516 and the capacitive sensing electrode 514. This indicator voltage can be applied to the control terminal 522 of the sense VCI 520 to provide an output from the pixel 512 which indicates proximity of the conductive object.

Pixels may be positioned sufficiently close together so as to be able to resolve contours of the skin such as those associated with epidermal ridges, for example those present in a fingerprint, palmprint or other identifying surface of the body. It will be appreciated in the context of the present disclosure that contours of the skin may comprise ridges, and valleys between those ridges. During touch sensing, the ridges may be relatively closer to a sensing electrode than the "valleys" between those ridges. Accordingly, the capacitance of a sensing electrode adjacent a ridge will be higher than that of a sensing electrode which is adjacent a valley. The description which follows explains how systems can be provided in which sensors of sufficiently high resolution to perform fingerprint and other biometric touch sensing may be provided over larger areas than has previously been possible.

As shown in FIG. 5 and FIG. 6 in addition to the sensor array 510, such a sensor may also comprise a dielectric shield 508, a gate drive circuit 510, and a read out circuit 526. A connector 525 for connection to a host device may also be included. This may be provided by a multi-channel connector having a plurality of conductive lines. This may be flexible, and may comprise a connector such as a flexi, or flexi-rigid PCB, a ribbon cable or similar. The connector 525 may carry a host interface 527, such as a plug or socket, for connecting the conductive lines in the connector to signal channels of a host device in which the sensor apparatus 501 is to be included.

The host interface 527 is connected by the connector 525 to the read-out circuit 526. A controller (506; FIG. 6) may be connected to the gate drive circuit 510 for operating the sensor array, and to the read-out circuit 526 for obtaining signals indicative of the self-capacitance of pixels of the sensor array 510.

The dielectric shield 508 is generally in the form of a sheet of an insulating material which may be transparent and flexible such as a polymer or glass. The dielectric shield 508 may be flexible, and may be curved. An 'active area' of this shield overlies the sensor array 510. In some examples, the Vas and other pixel components are carried on a separate substrate, and the shield 508 overlies these components on their substrate. In other embodiments the shield 508 provides the substrate for these components.

The sensor array 510 may take any one of the variety of forms discussed herein. Different pixel designs may be used, typically however the pixels 512 comprise at least a capacitive sensing electrode 514, a reference capacitor 516, and at least a sense VCI 520.

The array illustrated in FIG. 6 comprises a plurality of rows of pixels such as those illustrated in FIG. 5. Also shown in FIG. 6 is the gate drive circuit 510, the read out circuit 526, and a controller 506. The controller 506 is configured to provide a clock signal, e.g. a periodic trigger, to the gate drive circuit 526, and to the read-out circuit 526.

The gate drive circuit 510 comprises a plurality of gate drive channels 510-1, 510-2, 510-3, which it is operable to control separately, e.g. independently. Each such gate drive channel 510-1, 510-2, 510-3 comprises a voltage source arranged to provide a control voltage output. And each channel 510-1 is connected to a corresponding row of pixels 512 of the sensor array 510. In the arrangement shown in FIG. 6 each gate drive channel 510-1, 510-2, 510-3 is connected to the first plate of the reference capacitor 516 in each pixel 512 of its row of the sensor array 510. During each clock cycle, the gate drive circuit 510 is configured to activate one of the gate drive channels 510-1, 510-2, 510-3 by applying a gate drive pulse to those pixels. Thus, over a series of cycles the channels (and hence the rows) are activated in sequence, and move from one step in this sequence to the next in response to the clock cycle from the controller 506.

The read-out circuit 526 comprises a plurality of input channels 526-1, 526-2, 526-3. Each input channel 526-1, 526-2, 526-3 is connected to a corresponding column of pixels 512 in the sensor array 510. To provide these connections, the conduction path of the sense VCI 520 in each pixel 512 is connected to the input channel 526-1 for the column.

Each input channel 526-1, 526-2, 526-3 of the read out circuit 526 may comprise an analogue front end (AFE) and an analogue-to-digital converter (ADC) for obtaining a digital signal from the column connected to that input channel 526-1. For example it may integrate the current applied to the input channel during the gate pulse to provide a measure of the current passed through the sense VCI 520 of the active pixel 512 in that column. The read out circuit 526 may convert this signal to digital data using the ADC. Furthermore, the analogue front end performs impedance matching, signal filtering and other signal conditioning and may also provide a virtual reference.

In the sensor array 510 shown in FIG. 6, the conduction channel of the sense VCI 520 in each pixel connects the input channel of the read out circuit for that column to the gate drive channel for the pixel's row. In FIG. 6, the gate drive channel for the row thus provides a reference input. Operation of the sense VCI 520 modulates this reference input to provide the pixel output. This output signal from a pixel indicates the charge stored on the capacitive sensing electrode 514 in response to that reference input relative to that stored on the reference capacitor.

FIG. 5 includes a grid as a very schematic illustration of the rows and columns of pixels 512 which make up the array. Typically this will be a rectilinear grid, and typically the rows and columns will be evenly spaced. For example the pixels may be square. It will of course be appreciated that the grid shown in FIG. 5 is not to scale. Typically the sensor array has a pixel spacing of at least 200 dots per inch, dpi (78 dots per cm). The pixel spacing may be at least 300 dpi (118 dots per cm), for example at least 500 dpi (196 dots per cm).

Operation of the sensor array 510 of FIG. 6 will now be described.

On each cycle of operation, the gate drive circuit 524 and the read out circuit 526 each receive a clock signal from the controller 506.

In response to this clock signal, the gate drive circuit operates one of the gate drive channels to apply a control voltage to one of the rows of the array. In each pixel in the row, the control voltage from the gate drive channel is applied to the series connection of the reference capacitor 516 and the capacitive sensing electrode 514. The voltage at the connection 518 between the two provides an indicator voltage indicating the proximity of a conductive surface of an object to be sensed to the capacitive sensing electrode 514. This indicator voltage may be applied to the control terminal of the sense VCI 520 to control the impedance of the conduction path of the sense VCI 520. A current is thus provided through the conduction path of the sense VCI 520 from the gate drive to the input channel for the pixel's column. This current is determined by the gate drive voltage, and by the impedance of the conduction channel.

In response to the same clock signal, the read-out circuit 526 senses the pixel output signal at each input channel. This may be done by integrating the current received at each input of the read-out circuit 526 over the time period of the gate pulse. The signal at each input channel, such as a voltage obtained by integrating the current from the corresponding column of the array, may be digitised (e.g. using an ADC). Thus, for each gate pulse, the read-out circuit 526 obtains a set of digital signals, each signal corresponding to a column of the active row during that gate pulse. So the set of signals together represent the active row as a whole, and the output from each pixel being indicative of the charge stored on and/or the self-capacitance of the capacitive sensing electrode 514 in that pixel.

Following this same process, each of the gate-drive channels is activated in sequence. This drives the sense VCI 520 of each pixel connected to that channel into a conducting state for a selected time (typically the duration of one gate pulse). By activating the rows of the array in sequence the read out circuit, can scan the sensor array row-wise. Other pixel designs, other scan sequences, and other types of sensor array, may be used.

Figure 7:
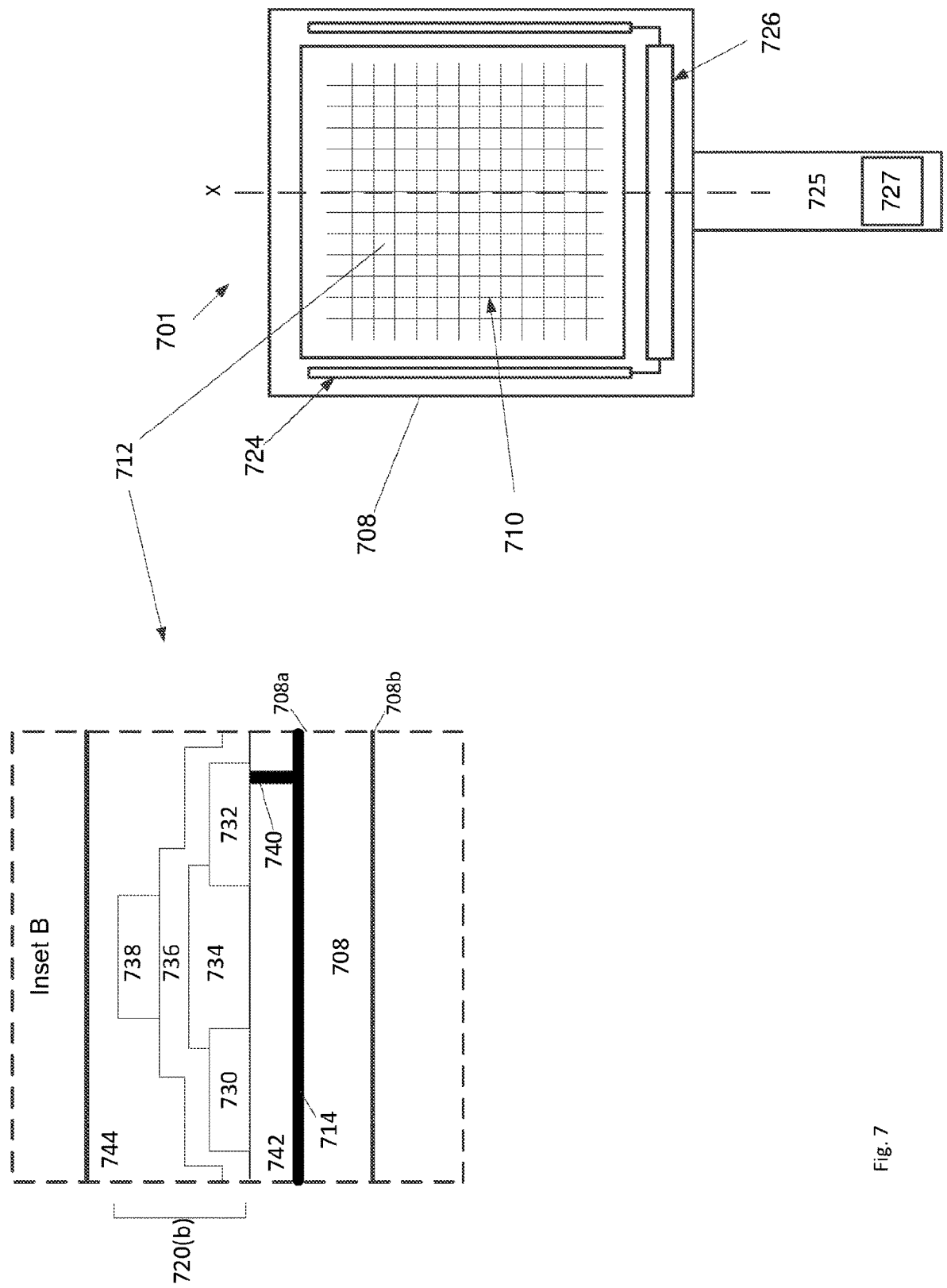
FIG. 7 is a schematic diagram of a plan view of a pixel apparatus comprising a pixel array, and Inset B of FIG. 7 shows an exemplary pixel structure of the pixel array.
Figure 8:
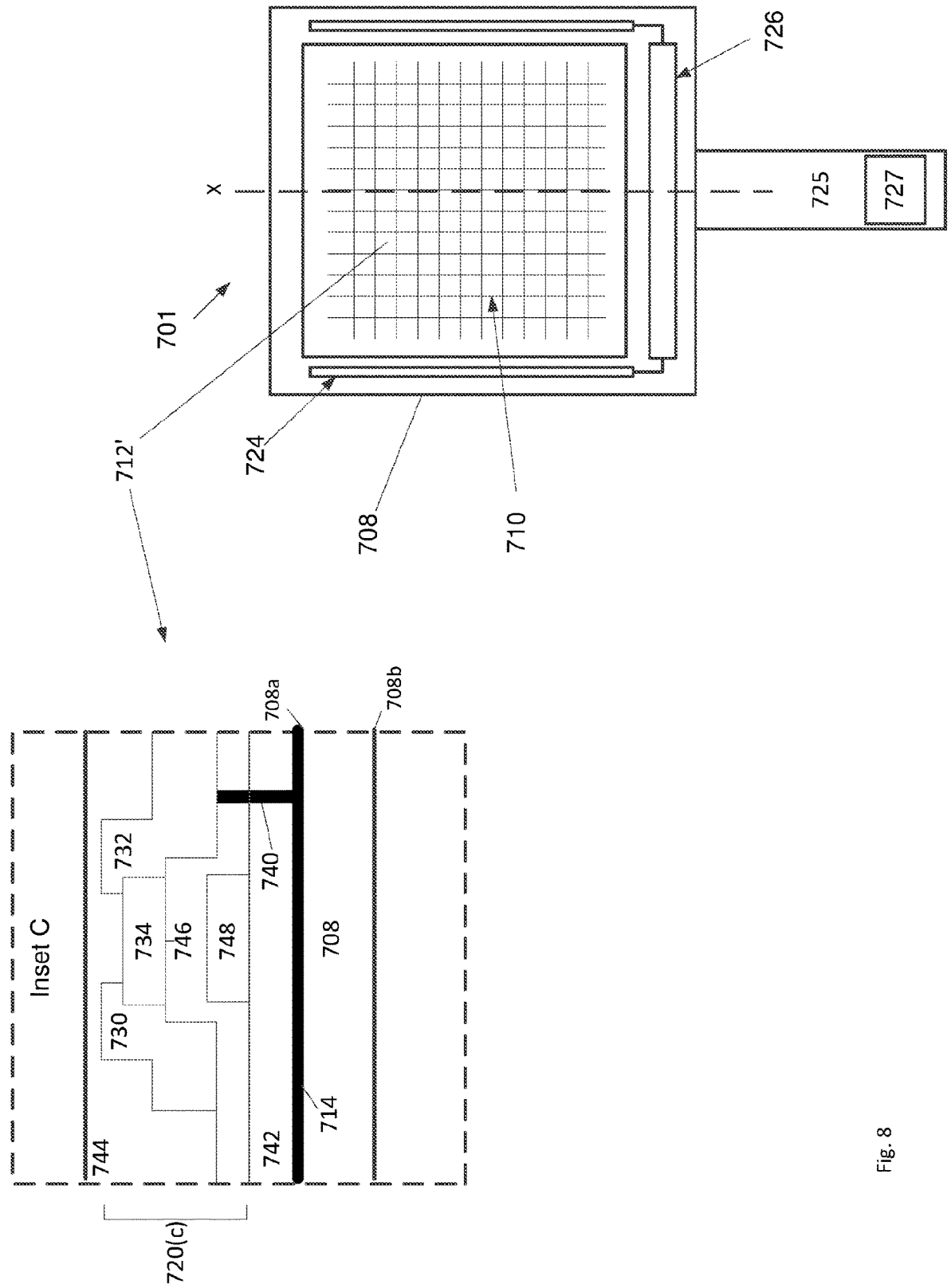
FIG. 8 is a schematic diagram of a plan view of a pixel apparatus comprising a pixel array, and Inset C of FIG. 8 shows an alternative exemplary pixel structure of the pixel array.

With reference to FIGS. 7 and 8, a further sensor apparatus will be described which may provide a biometric skin-contact sensor of the type disclosed herein.

FIG. 7 illustrates a sensor apparatus 701 having a sensor array 710 in which a pixel structure 712 may be incorporated. An exemplary cross-sectional structure of the pixel 712 is shown in a detailed view in Inset B. FIG. 8 shows a similar sensor apparatus 701 comprising an alternative pixel structure 712', which is shown in Inset C. FIGS. 7 and 8 will be described together below.

The pixel array 710 comprises a plurality of touch sensitive pixels 712, 712'. The pixel array 710 comprises rows and columns of adjacent individual pixels 712, 712'. Individual pixels 712, 712' are capable of being individually addressed. Typically, other than in respect of its position in the array, each pixel 712, 712' is identical to the others in the array 710. As illustrated, each pixel 712, 712' comprises a capacitive sensing electrode 714 for accumulating a charge in response to proximity of the surface of a conductive object to be sensed and a thin film transistor (TFT) 720, the structure of which may be as illustrated by TFT 720(*b*) in Inset B (top gate) of FIG. 7 or TFT 720(*c*) in Inset C (bottom gate) of FIG. 8.

A dielectric shield 708 provides the substrate on which layers of the pixel may be disposed. For example, a capacitive sensing electrode 714 and a TFT 720 may be "stacked" in layers on top of the dielectric shield 708, wherein the dielectric shield 708 is the substrate/carrier.

The structure of each individual pixel 712, 712' stacked on the dielectric shield 708 comprises a capacitive sensing electrode 714 coupled to a TFT 720. The capacitive sensing electrode 714 is disposed between the dielectric shield 708 and TFT 720, and is connected to the TFT 720 by a conductive via 740.

The capacitive sensing electrode 714 may be spaced away from the TFT 720 by an insulating layer 742, for example a passivation layer or dielectric layer. The insulating layer 742 may comprise an insulator material such as an inorganic Silicon Nitride, or an organic dielectric. The conductive via 740 is disposed through the passivation layer 742 to connect the capacitive sensing electrode 714 to the TFT 720 and/or the gate insulator layer 736 (depending on the TFT 720 configuration)

A top gate TFT, shown by 720(*b*) of FIG. 7 comprises: a first metal layer comprising: a source region 730, and a drain region 732; an active layer 734 disposed between the regions of the first metal layer; an insulating layer 736, or gate insulator layer, disposed on the active layer 734 and first metal layer; and a second metal layer 738, for example a gate region 738, disposed on and separated from the source 730, drain 732 and active 734 regions by the insulating layer. The first metal layer comprises a source region 730 and a drain region 732, which are separated from one another. The first metal layer is adjacent the active layer 734, for example a channel region 734, which comprises a semiconductor. The active/channel layer is adjacent the gate insulator layer 736, which comprises a dielectric. A second metal layer, adjacent the insulating layer 736 comprises a gate region 738. The structure of the TFT 720 is such that the first and second metal layers are separated by the gate insulator layer 736.

A TFT, as shown in 720(*c*) in FIG. 8 shows a bottom gate TFT which can be fabricated by an alternative process order comprising: a first metal layer comprising, for example a gate region 738; a gate insulator layer 736 disposed over the gate region 738 such that the gate region is covered by the insulating layer; an active layer 734 disposed over the insulating layer 736; and a second metal layer comprising, for example, a source region 730, and a drain region 732. In both top gate and bottom gate configurations, the source and drain regions comprise metallic islands and are separated such that they are conductively (e.g. electrically/ohmically) isolated in an "off" state. In an "on" state, the active region, comprising a semiconductor, provides a conductive path between the source and drain regions. The insulating layer 736 shields the first metalized layer from the second metalized layer in both top gate and bottom gate configurations.

The TFT 720 may be encapsulated by an additional passivation layer 744, for example a protective layer, once it has been deposited in the stack on the dielectric shield 708 acting as the substrate.

The source region 730 and drain region 732 are connected by the active layer/channel region 734 comprising a semiconductor. The layer of metal which provides the source, drain and active/channel regions of the TFT 720 can be referred to as a source-drain layer of the pixel. The source region 730 comprises a conductor and is connected to an input of the pixel. The drain region 732 also comprises a conductive material, and is typically made from the same material as the source region 730 for ease of manufacture. For example, the drain region 732 may be manufactured during the same process step as the source region 730. The drain region 732 is connected to an output of the pixel. The channel region 734, or active region, comprises a thin film semi-conductor which provides a conduction path between the source 730 and drain 732 regions when biased or in an "on" state.

The conductive via connects the capacitive sensing electrode 714 to the drain region 732 of the TFT 720.

In instances where the insulating/passivation layer 742 is in a the thinner range (e.g. 200-500 nm), the TFT 720 may be a bottom gate TFT (FIG. 8), such that the conductive via 740 passes through both insulating/passivation layer 742 and gate insulator layer 736 (of TFT 720). In instances where the insulating layer 742 is thicker (1-2 μm), the TFT 720 may be a top gate TFT (FIG. 7) such that the conductive via 740 passes only through the insulator layer 742. These arrangements may provide improved performance of the capacitive sensing electrode 714, although it will be appreciated that either can be used.

The spacing distance of the capacitive sensing electrode 714 from the TFT 720 "shields" the electronic circuit (or pixel circuit) from any external interference, for example from a resulting electromagnetic field. The electrode 714 and the spacing together provide the shielding effect.

In addition to each of the pixels 712, 712' in pixel array 710, such a pixel apparatus 701 comprises a gate drive circuit 724, and a read out circuit 726. The gate drive circuit 724 and the read out circuit 726 are connected to the TFTs 720 of the pixel 712, 712' via gate lines (rows) and source/data lines (columns) of the same conductive material as the source, drain and gate regions, such that a pixel can be individually addressed.

A connector 725 for connection to a host device may also be included. The connector 725 carries a host interface 727, such as a plug or socket, for connecting the conductive lines in the connector to signal channels of a host device in which the pixel apparatus 701 is to be included.

The host interface 727 is connected by the connector 725 to the read out circuit 724. A controller is connected to the gate drive circuit 726 for operating the pixel array, and to the read out circuit 726 for obtaining signals indicative of self-capacitance of pixels of the pixel array 710.

Each pixel 712, 712' can be individually addressed by virtue of the gate drive circuit 724, which comprises a plurality of gate drive channels and is configured to activate the gate drive channels in sequence. The connector 725 is provided by a multi-channel connector having a plurality of conductive lines. This can be flexible, and may comprise a connector such as a flexi, or flexi-rigid PCB, a ribbon cable or similar.

The plurality of layers, such as the dielectric shield 708, of the pixel 712, 712' can be disposed on the substrate using a plurality of techniques apparent to the skilled person in the context of this disclosure. For example, the substrate may comprise/provide the dielectric shield 708. The capacitive sensing electrode 714 being disposed on the dielectric shield 708 may improve encapsulation and may increase sensitivity to the object to be sensed, as well as performance of the pixel. In a typical pixel apparatus, the dielectric shield 708 that provides a surface to be touched by an object to be sensed is applied as a final layer of the structure, and is not utilised as a substrate onto which the capacitive sensing electrode 714 is deposited. Encapsulation of such typical pixels can be problematic. By disposing the layers of the pixel 712 onto the dielectric shield 708, encapsulation can be improved. The method of manufacture of the pixel 712, 712' can also be simplified, in particular for large-area arrays.

The TFT 720 layers of the pixel may also be deposited onto the substrate, wherein the capacitive sensing electrode 714 is disposed between the TFT 720 and the dielectric shield 708. Beneficially, the manufacturing process can be further simplified using this technique and pixel performance may be further enhanced by improving alignment, for example.

The combined elements of the sensor apparatus work to sense an interaction with the pixel array 710 at one or more pixels 712, 712'.

The pixel array 710 disposed on the dielectric shield 708 in the sensor apparatus 701 provides a sensor, for example an active area defined by the pixels 712, 712', to be touched by an object 550 to be sensed. The capacitive sensing electrode 714 is adjacent to the first surface 708*a* of the dielectric shield 708. A change of capacitance in the capacitive sensing electrode 714 occurs when the second surface 708*b* of the dielectric shield 708 is touched or an object is sensed. Depositing the capacitive sensing electrode 714 adjacent to the first surface 708*a* of the dielectric shield advantageously provides greater sensitivity to the object to be sensed. Sensing the object comprises determining a change in capacitance of a pixel 712, 712' (or pixels) in the pixel array 710.

The pixels 712, 712' can be arranged in a grid, for example a matrix, construction and are typically arranged linearly to simplify manufacturing. Linear arrangements in particular provide ease of manufacture when scaling up the array size, although the pixel array 710 is not limited to such a configuration.

In some examples, some, or all, of the pixels 712, 712' in the array 710 may also comprise a reference capacitor. The reference capacitor may be connected to the TFT 720 and the capacitive sensing electrode 714. One of the plates of the reference capacitor may be in line with the source-drain layer of the TFT 720. One of the plates of the reference capacitor may be connected to the source-drain layer of the TFT 720. The other plate of the reference capacitor may be in line with the gate drive. This other plate of the reference capacitor may be connected to the gate drive. The reference capacitor may help to reduce parasitic capacitance in the pixel array 710. A reference capacitor may also be stacked with the layers disposed on the dielectric shield 708. The reference capacitor enables touch capacitance measurement.

Figure 9:
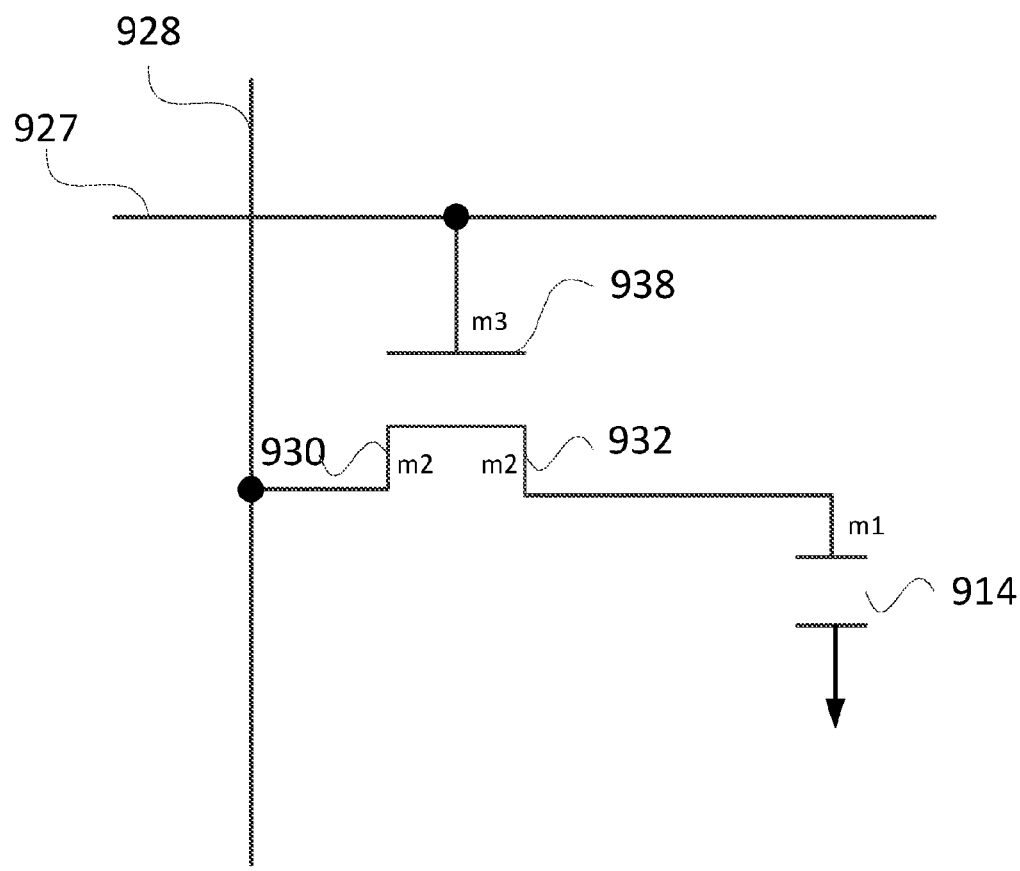
FIG. 9 is a schematic diagram of a pixel circuit diagram of a top gate structure of a pixel in a pixel array.

In other examples, a reference capacitor need not be provided. FIG. 9 illustrates one example pixel circuit in which a reference capacitor is not provided. This pixel circuit can be formed from the above described structure and deposition methods. The circuit comprises a TFT 930, 932, 938, and a capacitive sensing electrode 914. The pixel circuit may be addressed by a gate line 927 and a source-data line 928, and outputs to a common line, for example a Vcom connection. The TFT comprises a source region 930, a drain region 932 and a gate electrode 938. The gate line 927 is connected to the gate electrode 938. The source region 930 is connected to the source-data line 928. The capacitive sensing electrode is connected to the drain region 932, which is connected to the source region 930, as shown in FIG. 9.

The example pixel circuit of FIG. 9 may be provided by a layered pixel structure. For example the layered pixel structure may comprise three conductive layers m1, m2, m3 are provided. These may be metallisation layers, such as those deposited in the above method. A first metallization layer m1 provides the capacitive sensing electrode 914. The first metallization layer m1 may be deposited on a carrier substrate, such as a dielectric shield. A second metallisation layer, m2, provides the source 930 and drain 932 region of the TFT. The second layer m2 may be the type as would be provided in a top gate arrangement (see e.g. FIG. 7, Inset B). A third metallisation layer, m3, provides the gate electrode 938. In a bottom gate configuration (see FIG. 8, Inset C), second and third metallisation layers are reversed. A conductive via may be provided to provide an electrical connection between the capacitive sensing electrode 914 and the drain region 932 of the TFT, as can be seen in FIG. 9.

As illustrated in FIG. 9, the deposited metal layers denoted as m1, m2 and m3 adjacent the features of the circuit in FIG. 9 can be connected to form the circuit. The illustrated circuit components of the circuit diagram in FIG. 9 may depict both top gate and bottom gate arrangements. A top gate configuration is illustrated in FIG. 9, but it will be appreciated that m2 and m3 can be swapped in order to correspond to a bottom gate configuration.

In some examples, a reference capacitor could be included in the pixel circuit of FIG. 9. The reference capacitor may be connected to the drain region 932. For example, one of the plates of the reference capacitor may be provided by the second metallisation layer. A second plate of the reference capacitor may also be provided by the third metallisation layer. The second plate of the reference capacitor may be separated from the gate electrode 938, for example by patterning (e.g. lithography or etching) during manufacture.

It will be appreciated that the disclosure, as a whole, may be used to provide pixel circuits such as that described with reference to FIG. 9. It will however also be appreciated in the context of the present disclosure that other circuits may also be used, whereby the layers of the pixel are connected in a different manner such that a different circuit is made. The fundamental layers and the method of deposition methods would remain substantially consistent with the above disclosed embodiments. Advantages achieved by using the surface to be touched in a touch sensor also as the substrate for deposition of the pixel stack may of course be provided in other pixel circuits.

Figure 10:
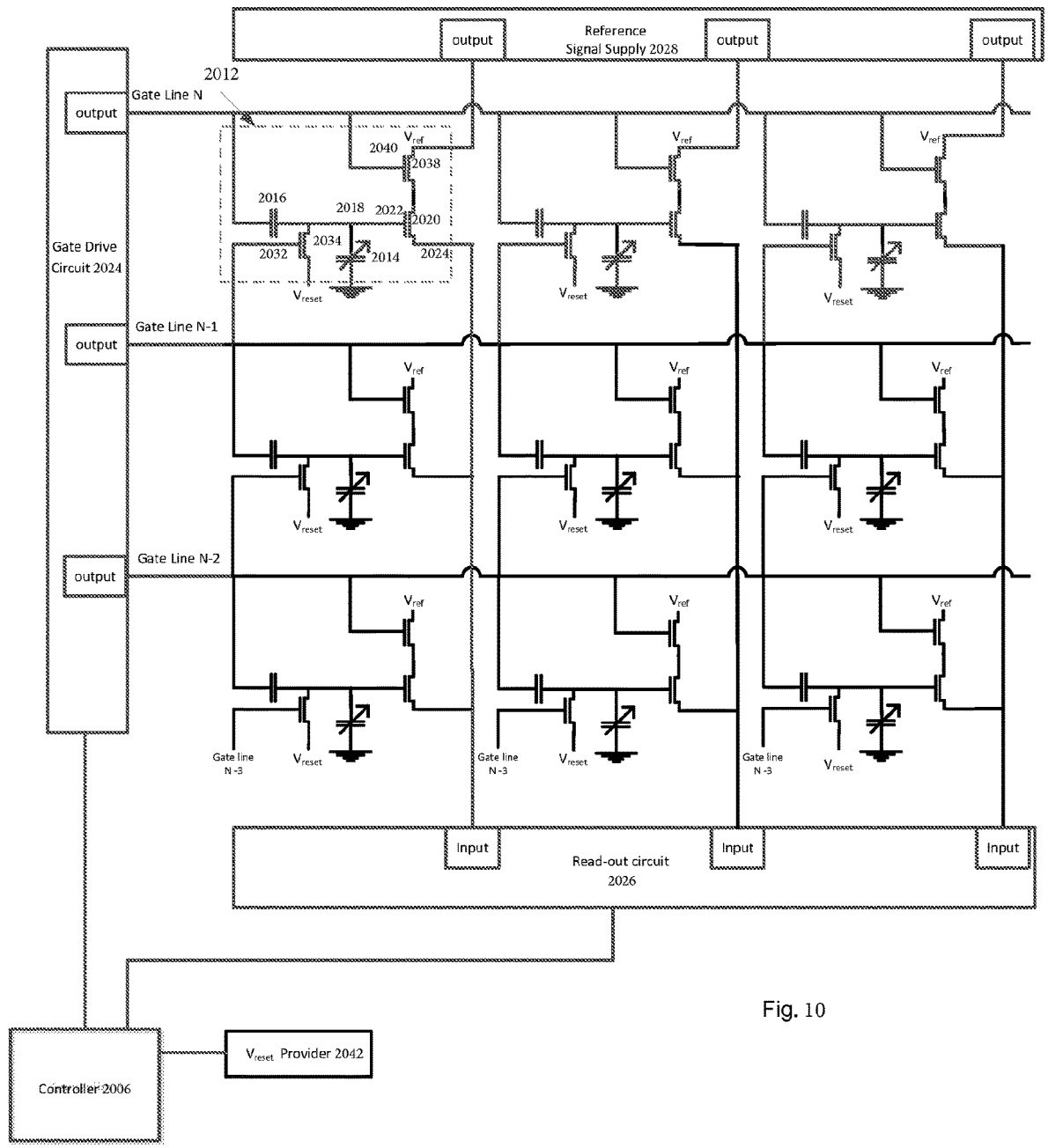
FIG. 10 shows a circuit diagram of another sensor array of the type shown in FIG. 5.

FIG. 10 shows a sensor array 2010 comprising a plurality of pixels, and a reference signal supply 2028 for supplying a reference signal to the pixels. This can avoid the need for the gate drive power supply also to provide the current necessary for the read-out signal.

Also shown in FIG. 10 is the gate drive circuit 2024, the read-out circuit 2026, and the controller 2006.

The sensor array 2010 may also benefit from the inclusion of a reset circuit 2032, 2034 in each pixel. This may allow the control terminal 2022 of the pixel to be pre-charged to a selected reset voltage whilst the pixel is inactive (e.g. while another row of the array is being activated by the application of a gate pulse to another, different, row of the array).

In these embodiments the sensor may also comprise a reset voltage provider 2042 for providing a reset voltage to each of the pixels 2012 of the array as described below. The reset voltage provider 2042 may comprise voltage source circuitry, which may be configured to provide a controllable voltage, and may be connected to the controller 2006 to enable the controller 2006 to adjust and fix the reset voltage.

The reset voltage may be selected to tune the sensitivity of the pixel. In particular, the output current of the sense VCI 2020 typically has a characteristic dependence on the indicator voltage at the control terminal 2022 and its switch-on voltage. Thus the reset voltage may be chosen based on the switch-on voltage of the sense VCI 2020. The characteristic may also comprise a linear region in which it may be preferable to operate.

The pixels illustrated in FIG. 10 are similar to those illustrated in FIG. 5 and FIG. 6 in that each comprise a capacitive sensing electrode 2014, and a reference capacitor 2016 connected with a capacitive sensing electrode 2014. The connection between these two capacitances provides an indicator voltage, which can for example be connected to the control terminal 2022 of a sense VCI 2020. In addition, the pixels of the sensor array illustrated in FIG. 10 also comprise a further two Vas 2034, 2038, and a connection to the reset voltage provider 2042, and a connection to the reference signal supply 2028.

As noted above, the sense VCI 2020 is arranged substantially as described above with reference to FIG. 5, in that its control terminal 2022 is connected to the connection between the reference capacitor 2016 and the capacitive sensing electrode 2014. However, the conduction path of the sense VCI 2020 is connected differently in FIG. 10 than in FIG. 5. In particular, the conduction channel of the select VCI 2038 connects the conduction channel of the sense VCI 2020 to the reference signal supply 2028 which provides a voltage $V_{ref}$. Thus, the conduction channel of the sense VCI 2020 is connected in series between the conduction channel of the select VCI 2038 and the input of the read-out circuit for the column. The select VCI 2038 therefore acts as a switch that, when open, connects the sense VCI 2020 between, $V_{ref}$, the reference signal supply 2028 and the input of the read-out circuit and, when closed, disconnects the sense VCI from the reference signal supply 2028. In the interests of clarity, the connection between the conduction channel of the select VCI and $V_{ref}$, the output of the reference signal supply 2028 is shown only in the top row of the array of pixels. The connection reference signal supply 2028 in the lower rows of the array is indicated in the drawing using the label $V_{ref}$.

The select VCI 2038 is therefore operable to inhibit the provision of signal from any inactive pixel to the input of the read-out circuit 2026. This can help to ensure that signal is only received from active pixels (e.g. those in the row to which the gate drive pulse is being applied).

In an embodiment each column of pixels is virtually connected to a ground or reference voltage. As such there may be no voltage differences on each of the columns thereby minimising parasitic capacitance. Furthermore, the reference signal supply may apply a current-drive rather than a voltage-drive which further reduces any effect parasitic capacitance could have on the signal applied by the active pixels on the inputs of the read-out circuit 2026.

The gate drive channel for the pixel row is connected to the first plate of the reference capacitor 2016, and to the control terminal of a select VCI 2038. As in the pixel illustrated in FIG. 5 and FIG. 6, the connection to the reference capacitor 2016 and capacitor sensing electrode 2014 means that the gate drive voltage is divided between the reference capacitor 2016 and the capacitive sensing electrode 2014 to provide the indicator voltage which controls the sense VCI 2020. The connection to the control terminal 2040 of the select VCI 2038 however means that, when the pixel is not active, the conduction path of the sense VCI 2020 is disconnected from the reference signal supply 2028.

A control terminal 2022 of the sense VCI 2020 is connected to the second plate of the reference capacitor 2016. The conduction path of the sense VCI 2020 connects the reference signal supply 2028 to the input of the read-out circuit 2026 for the pixel's column.

A conduction path of the reset VCI 2034 is connected between the second plate of the reference capacitor 2016 and a voltage output of the reset voltage provider, for receiving the reset voltage. The control terminal 2032 of the reset VCI 2034 is connected to a reset signal provider, such as the gate drive channel of another row of the sensor array. This can enable the reset VCI 2034 to discharge the reference capacitor 2016 during activation of another row of the array (e.g. a row of the array which is activated on the gate pulse prior to the pixel's row) or to pre-charge the control terminal 2022 of the sense VCI 2020 to the reset voltage.

Operation of the sensor array of FIG. 10 will now be described.

The gate drive circuit 2024 and the read-out circuit 2026 each receive a clock signal from the controller 2006. In response to this clock signal, the gate drive circuit 2024 activates a first gate drive channel of the gate drive circuit 2024 to provide a gate pulse to a row of the array 2010. A control voltage is thus applied to the control terminal of the select VCI 2038 of the pixels in the first row (the active row during this gate pulse).

The control voltage is also applied to the control terminal of the reset VCI 2034 of the pixels in a second row (inactive during this gate pulse).

In the first row (the active row), the conduction channel of the select VCI 2038 is switched into a conducting state by the control voltage (e.g. that which is provided by the gate pulse). The conduction channel of the select VCI 2038 thus connects the conduction channel of the sense VCI 2020 to the reference signal supply 2028.

The control voltage is also applied to the first plate of the reference capacitor 2016. The relative division of voltage between the sensing electrode 2014 and the reference capacitor 2016 provides an indicator voltage at the connection between the reference capacitor 2016 and the capacitive sensing electrode 2014 as described above with reference to FIG. 5 and FIG. 6. The indicator voltage is applied to the control terminal 2022 of the sense VCI 2020 to control the impedance of the conduction channel of the sense VCI 2020. Thus, the sense VCI 2020 connects the reference signal supply 2028 to the input channel of the read-out circuit 2026 for that column, and presents an impedance between the two which indicates the capacitance of the capacitive sensing electrode 2014. Please note, the reference signal supply may be provided by a constant voltage current supply.

A current is thus provided through the conduction path of the sense VCI 2020 from the reference signal supply 2028 to the input channel of the read-out circuit 2026 for the pixel's column. This current is determined by the voltage of the reference signal supply and by the impedance of the conduction channel of the sense VCI.

In response to the same clock signal from the controller 2006, the read-out circuit 2026 senses the pixel output signal at each input channel (e.g. by integrating the current provided to each input channel), and digitises this signal. The integration time of the read-out circuit 2026 may match the duration of the gate pulse.

Thus, in each clock cycle, the read-out 2026 circuit obtains a set of digital signals, each signal corresponding to the signals sensed from each column of the active row during the gate pulse. The output from each pixel 2012 in the row (each channel during that gate pulse) being indicative of the charge stored on the capacitive sensing electrode in that pixel.

In the second (inactive) row the control voltage is applied to the control terminal 2032 of the reset VCI 2034. This causes the reset VCI 2034 of the pixels in the inactive row to connect the second plate of their reference capacitors 2016 to a reset voltage provided by the reset voltage provider. This may discharge (e.g. at least partially remove) charge accumulated on the pixels of the inactive row, or it may charge them to the reset voltage, before they are next activated in a subsequent gate pulse. This reset voltage may be selected to tune the sensitivity of the pixels.

At the boundaries of the pixel array, where an N−1 gate line is not available, a dummy signal may be used to provide the control signal to the reset VCI. The gate drive circuit 2024 may provide the dummy signal. This may be provided by a gate drive channel which is only connected to the rest VCIs of a row at the boundary of the array, but not to any sense or select VCIs.

As illustrated in FIG. 10, the reset VCI 2034 of the pixels may be connected to the gate drive circuit so that each row is discharged in this way by the gate pulse which activates the immediately preceding row, which may be an adjacent row of the array.

A biometric skin-contact sensor of the type disclosed herein may be provided by the sensor apparatuses described above. Such a biometric skin-contact sensor may first be formed to provide a formable substrate (e.g. provided in isolation). This formable substrate may then be manipulated (e.g. bent) accordingly to conform to a desired shape for the biometric skin-contact sensor. In examples, a substrate onto which the skin-contact sensor is provided may be thinned down to a thickness at which it becomes conformable. In some examples, manufacturing methods such as those for manufacturing rollable OLED TVs may be used to provide aspects of the present disclosure.

In some examples, pressure sensing may be used in combination with the biometric skin-contact sensing. Pressure sensors may be included to detect the pressure applied to the sensor. For example, a force-collector sensor may be used in which strain or deflection is measured in a component of the sensor, and the pressure is determined therefrom. Additionally and/or alternatively to the inclusion of a pressure sensor, pressure may be sensed based on the identified contact location and a surface area of this contact location. For example, an indication that the contact location has increased may indicate that the pressure being applied has increased. The pressure being applied may also be determined based on stored biometric data for a user (e.g. their normal fingertip area when resting on the sensor) and the current cross sectional area in contact with the sensor. This determination may be specific based on which region of their anatomy is in contact with the sensor. For example, the change in pressure may be determined based on both (i) the cross sectional area of the region in contact with the sensor and the normal cross-sectional area for such a region, and (ii) which region it is that is in contact within the sensor.

An amount of the increase in pressure may be determined based on an amount by which the contact area (the area of the operator's anatomy in contact with the device) has increased. Pressure sensing may be based on a ratio of a first contact area between the operator and the device and a second contact area between the operator and the device. Control of the pointer may be based on the determined pressure being applied. Pressure may be determined based on which part of the operator's anatomy is in contact with the device. For example, for a given region of an operator's anatomy there may be localised variations in which specific region is in contact with the device. For example, an operator may press lightly with the tip of a finger, but may press more firmly using the underside of the top portion of their finger, as opposed to the tip of the finger.

It will be appreciated from the discussion above that the embodiments shown in the figures are merely exemplary, and include features which may be generalised, removed or replaced as described herein and as set out in the claims. With reference to the drawings in general, it will be appreciated that schematic functional block diagrams are used to indicate functionality of systems and apparatus described herein. In addition the processing functionality may also be provided by devices which are supported by an electronic device. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

As will be appreciated by the skilled reader in the context of the present disclosure, each of the examples described herein may be implemented in a variety of different ways. Any feature of any aspects of the disclosure may be combined with any of the other aspects of the disclosure. For example method aspects may be combined with apparatus aspects, and features described with reference to the operation of particular elements of apparatus may be provided in methods which do not use those particular types of apparatus. In addition, each of the features of each of the embodiments is intended to be separable from the features which it is described in combination with, unless it is expressly stated that some other feature is essential to its operation. Each of these separable features may of course be combined with any of the other features of the embodiment in which it is described, or with any of the other features or combination of features of any of the other embodiments described herein. Furthermore, equivalents and modifications not described above may also be employed without departing from the invention.

Certain features of the methods described herein may be implemented in hardware, and one or more functions of the apparatus may be implemented in method steps. It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented in computer programs, or in hardware or in any combination thereof. Computer programs include software, middleware, firmware, and any combination thereof. Such programs may be provided as signals or network messages and may be recorded on computer readable media such as tangible computer readable media which may store the computer programs in non-transitory form. Hardware includes computers, handheld devices, programmable processors, general purpose processors, application specific integrated circuits (ASICs), field programmable gate arrays (FPGAs), and arrays of logic gates.

Any processors used in the computer system (and any of the activities and apparatus outlined herein) may be implemented with fixed logic such as assemblies of logic gates or programmable logic such as software and/or computer program instructions executed by a processor. The computer system may comprise a central processing unit (CPU) and associated memory, connected to a graphics processing unit (GPU) and its associated memory. Other kinds of programmable logic include programmable processors, programmable digital logic (e.g., a field programmable gate array (FPGA), a tensor processing unit (TPU), an erasable programmable read only memory (EPROM), an electrically erasable programmable read only memory (EEPROM), an application specific integrated circuit (ASIC), or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof. Such data storage media may also provide the data store of the computer system (and any of the apparatus outlined herein).

Other examples and variations of the disclosure will be apparent to the skilled addressee in the context of the present disclosure.

The invention claimed is:
1. A biometric skin-contact sensor comprising:
a contact sensing area comprising an array of pixels, each pixel comprising a thin film transistor and a capacitive sensing electrode for sensing contact; and
a controller coupled to the contact sensing area and configured to operate the array of pixels to switch between a low resolution mode and a high resolution mode;
wherein in the low resolution mode the sensor is operable to obtain contact location data comprising an indication of a sub-region of the contact sensing area in which contact is sensed;
wherein in the high resolution mode the sensor is operable to obtain biometric data for skin interacting with the contact sensing area by identifying a difference in capacitance between valleys and ridges of the skin;

wherein when operating in the low resolution mode, the sensor is configured to perform a scan across the sensor array for determining whether or not one or more sub-regions of the contact sensing area are being contacted, and wherein only a subset of the sensor pixels are activated for each scan of the sensor array;

wherein, for each pixel, a conductive channel of the transistor is connected between a reference signal supply and an input to a read-out circuit of the sensor, and the capacitive sensing electrode is connected to a control terminal of the transistor; and wherein activating a pixel comprises applying a signal to that pixel so that the transistor outputs a read-out signal to the input of the read-out circuit.

2. The biometric skin-contact sensor of claim 1, wherein the controller is configured to switch from the low resolution mode to the high resolution mode in the event that contact is sensed in the low resolution mode.

3. The biometric skin-contact sensor of claim 1, wherein the controller is configured to switch from the high resolution mode to the low resolution mode in the event that contact is not sensed in the high resolution mode.

4. The biometric skin-contact sensor of claim 1, wherein the controller is configured to select a first sub-region of the contact sensing area based on the obtained contact location data.

5. The biometric skin-contact sensor of claim 4, wherein in the high resolution mode the sensor is configured to operate at a high resolution in the first sub-region and a lower resolution in at least one region of the contact sensing area outside the first sub-region.

6. The biometric skin-contact sensor of claim 5, wherein operating at the lower resolution comprises at least one of: (i) operating at a resolution used when in the low resolution mode; (ii) obtaining no data from the at least one region of the contact sensing area outside the first sub-region.

7. The biometric skin-contact sensor of claim 1, wherein using only a subset of the pixels comprises skipping operation of selected rows and/or columns in the array.

8. The biometric skin-contact sensor of claim 1, wherein the controller is configured to determine whether the sub-region in which contact is sensed is moving based on the obtained contact location data.

9. The biometric skin-contact sensor of claim 1, wherein the controller is configured to control the sensor to sequentially obtain: (i) first contact location data comprising an indication of a first sub-region of the contact sensing are in which contact is sensed, and then (ii) second contact location data comprising an indication of a second sub-region of the contact sensing are in which contact is sensed; and wherein the controller is configured to determine, based on the first and second sub-regions, an indication of pressure applied to the contact sensing area.

10. The biometric skin-contact sensor of claim 4, wherein the controller is configured to select the first sub-region based also on at least one of: (i) a size, (ii) a shape and/or (iii) a pressure, of the skin interacting with the contact sensing area.

11. The biometric skin-contact sensor of claim 4, wherein the controller is configured to select the first sub-region so that it encompasses the entirety of the contact sensing area in which contact is sensed.

12. The biometric skin-contact sensor of claim 11, wherein the controller is configured to select the first sub-region so that it includes a border region around the area in which contact is sensed.

13. The biometric skin-contact sensor of claim 1, wherein the sensor is operable to be connected to a computer to receive a signal from a said computer indicating a desired functionality for the sensor, and wherein the controller is configured to control operation of the array of pixels to select a mode of operation based on the received signal.

14. The biometric skin-contact sensor of claim 1, wherein each pixel comprises a sense transistor and a select transistor, wherein the capacitive sensing electrode is connected to the control terminal of the sense transistor.

15. The biometric skin-contact sensor of claim 14, wherein the select transistor is configured to selectively connect a conductive channel of the sense transistor to the reference signal supply.

16. The biometric skin-contact sensor of claim 15, wherein activating the pixel comprises applying a signal to a control terminal of the select transistor to connect the conductive channel of the sense transistor to the reference signal supply.

17. The biometric skin-contact sensor of claim 14, wherein a conductive channel of the select transistor is connected in series between a conductive channel of the sense transistor and the reference signal supply.

18. A method of operating a biometric skin-contact sensor comprising a contact sensing area comprising an array of pixels, each pixel comprising a thin film transistor and a capacitive sensing electrode for sensing contact, the method comprising:

operating the array in a low resolution mode to obtain an indication of a sub-region of the contact sensing area in which contact is sensed;

operating the array in a high resolution mode to obtain biometric data for skin interacting with the contact sensing area in a first sub-region selected based on the sub-region of the contact sensing area in which contact is sensed, wherein obtaining the indication of the sub-region of the contact sensing area in which contact is sensed comprises using only a subset of the pixels in the array to sense contact wherein operating in the low resolution mode comprises performing a scan across the sensor array for determining whether or not one or more sub-regions of the contact sensing area are being contacted, and wherein only a subset of the sensor pixels are activated for each scan of the sensor array; and wherein, when a pixel is activated, a conductive channel of the transistor of the pixel is connected to a reference signal supply and the transistor outputs a read-out signal to an input of a read-out circuit.

19. A tangible, non-transitory computer program product comprising computer program instructions configured to program a processor to perform the method of claim 18.

20. A biometric skin-contact sensor comprising:

a contact sensing area comprising an array of pixels, each pixel comprising a thin film transistor and a capacitive sensing electrode for sensing contact; and a controller coupled to the contact sensing area and configured to operate the array of pixels to switch between a low resolution mode and a high resolution mode;

wherein in the low resolution mode the sensor is operable to obtain contact location data comprising an indication of a sub-region of the contact sensing area in which contact is sensed;

wherein in the high resolution mode the sensor is operable to obtain biometric data for skin interacting with the contact sensing area by identifying a difference in capacitance between valleys and ridges of the skin;

wherein when operating in the low resolution mode, the sensor is configured to determine whether or not one or more sub-regions of the contact sensing area are being contacted by activating a subset of the sensor pixels of the sensor array;

wherein at least one of the activated sensor pixels is separated from another activated sensor pixel by one or more inactivated sensor pixels;

wherein, for each pixel, a conductive channel of the transistor is connected between a reference signal supply and an input to a read-out circuit of the sensor, and the capacitive sensing electrode is connected to a control terminal of the transistor; and wherein activating a pixel comprises applying a signal to that pixel so that the transistor outputs a read-out signal to the input of the read-out circuit.

* * * * *